US011863099B2

(12) United States Patent
Yamakawa et al.

(10) Patent No.: US 11,863,099 B2
(45) Date of Patent: Jan. 2, 2024

(54) AIR CONDITIONER AND DRIVING DEVICE

(71) Applicant: Mitsubishi Electric Corporation, Tokyo (JP)

(72) Inventors: Takashi Yamakawa, Tokyo (JP); Koichi Arisawa, Tokyo (JP); Kenji Iwazaki, Tokyo (JP); Keisuke Uemura, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/334,834

(22) PCT Filed: Oct. 31, 2016

(86) PCT No.: PCT/JP2016/082210
§ 371 (c)(1),
(2) Date: Mar. 20, 2019

(87) PCT Pub. No.: WO2018/078842
PCT Pub. Date: May 3, 2018

(65) Prior Publication Data
US 2020/0021231 A1    Jan. 16, 2020

(51) Int. Cl.
*H02P 29/024* (2016.01)
*H01H 9/56* (2006.01)
*F24F 11/88* (2018.01)

(52) U.S. Cl.
CPC ............ *H02P 29/024* (2013.01); *F24F 11/88* (2018.01); *H01H 9/563* (2013.01)

(58) Field of Classification Search
CPC .......... F24F 11/88; H01H 9/563; H02P 21/02; H02P 25/18; H02P 29/024; H02P 6/12;
(Continued)

(56) References Cited

U.S. PATENT DOCUMENTS 6,160,414 A    12/2000 Matsubara et al.
2007/0210733 A1*  9/2007 Du .................. H02K 1/278
                                                318/268
(Continued)

FOREIGN PATENT DOCUMENTS

CN    105589009 A    5/2016
EP      3018678 A1   5/2016
(Continued)

OTHER PUBLICATIONS

Omura (CN 1115135 A) "Without The Commutator Motor Control Device And Abnormity Detecting Method And Air Conditioner" Date Published Jan. 17, 1996 (Year: 1996).*
(Continued)

*Primary Examiner* — Jorge L Carrasquillo
(74) *Attorney, Agent, or Firm* — POSZ LAW GROUP, PLC

(57) ABSTRACT

An air conditioner includes a compressor to compress a refrigerant used in a refrigeration cycle, a converter to generate a DC voltage, an inverter to generate three-phase AC voltages from the DC voltage, a motor to produce a driving force for driving the compressor with a plurality of coils, the three-phase AC voltages being applied to the coils, a connection switching unit to switch connection states of the coils between a first connection state and a second connection state, and a controller to detect an abnormality of the connection switching unit.

20 Claims, 13 Drawing Sheets

(58) Field of Classification Search
CPC .. H02P 8/36; H02P 29/60; H02H 7/26; H04Q 1/032
USPC .................................................. 318/400.21
See application file for complete search history.

(56) References Cited

U.S. PATENT DOCUMENTS

| | | | | |
|---|---|---|---|---|
| 2009/0001921 | A1* | 1/2009 | Mills, Jr. .................. | H02P 1/44 318/789 |
| 2010/0237815 | A1 | 9/2010 | Higashikawa et al. | |
| 2014/0225552 | A1* | 8/2014 | Shinomoto ............ | B60L 50/51 318/504 |
| 2015/0168033 | A1* | 6/2015 | Yamakawa ............ | H02P 27/02 62/324.6 |
| 2016/0134205 | A1 | 5/2016 | Bock et al. | |

FOREIGN PATENT DOCUMENTS

| | | |
|---|---|---|
| JP | H04-255428 A | 9/1992 |
| JP | H07-007962 A | 1/1995 |
| JP | H10-023795 A | 1/1998 |
| JP | 2007-151300 A | 6/2007 |
| JP | 2008-228513 A | 9/2008 |
| JP | 2009-273348 A | 11/2009 |
| JP | 5264969 B2 | 12/2011 |
| JP | 2012-227981 A | 11/2012 |
| JP | 2015056918 * | 9/2013 ............. Y02T 10/72 |
| JP | 2014-241720 A | 12/2014 |
| JP | 2015056918 * | 3/2015 ............. Y02T 10/72 |
| WO | 2009/084354 A1 | 7/2009 |
| WO | 2016/051456 A1 | 4/2016 |

OTHER PUBLICATIONS

Office Action dated Oct. 14, 2020 in connection with counterpart Korean Patent Application No. 10-2019-7008074 (and English machine translation).
Office Action dated Jul. 7, 2020 issued in corresponding JP patent application No. 2018-547068 (and English translation).
Japanese Office Action dated Dec. 10, 2019 issued in corresponding JP application No. 2018-547068 (with English translation).
ffice Action dated Mar. 4, 2021 in connection with counterpart European Patent Application No. 16920249.6.
International Search Report of the International Searching Authority dated Jan. 24, 2017 for the corresponding international application No. PCT/JP2016/082210 (and English translation).
Extended European Search Report dated Jul. 9, 2019 issued in corresponding EP application No. 16920249.6.
Office Action dated Dec. 15, 2021 in connection with counterpart Chinese Patent Application No. 201680089711.8 (and English machine translation).

* cited by examiner

FIG. 4
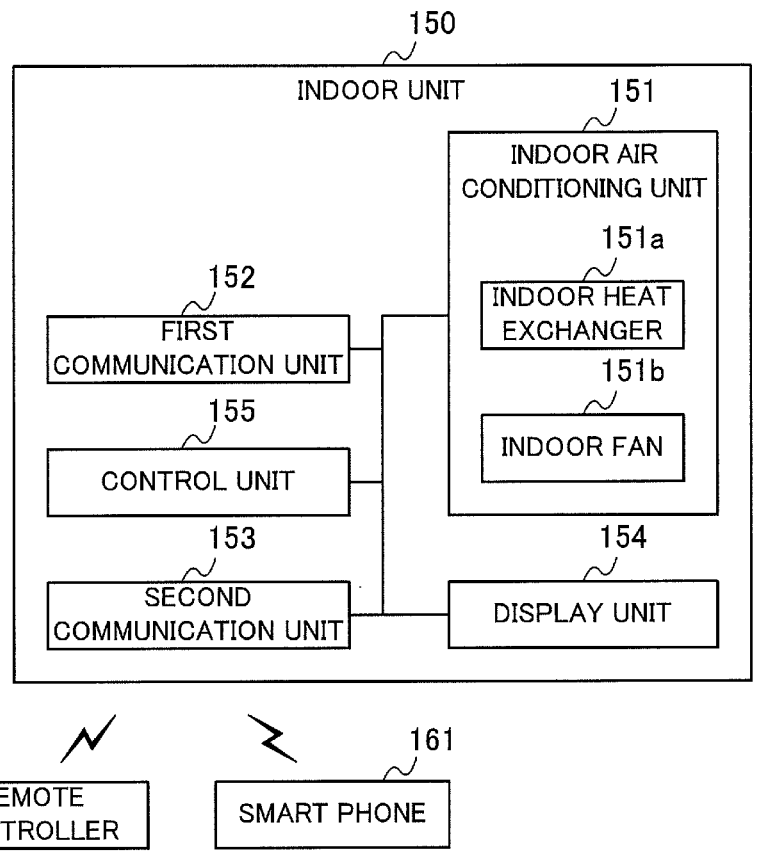
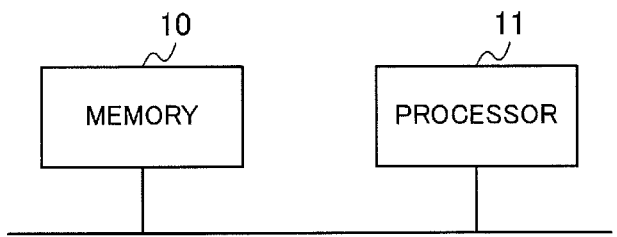
FIG. 5A
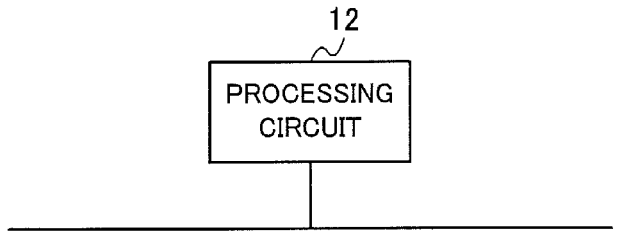
FIG. 5B

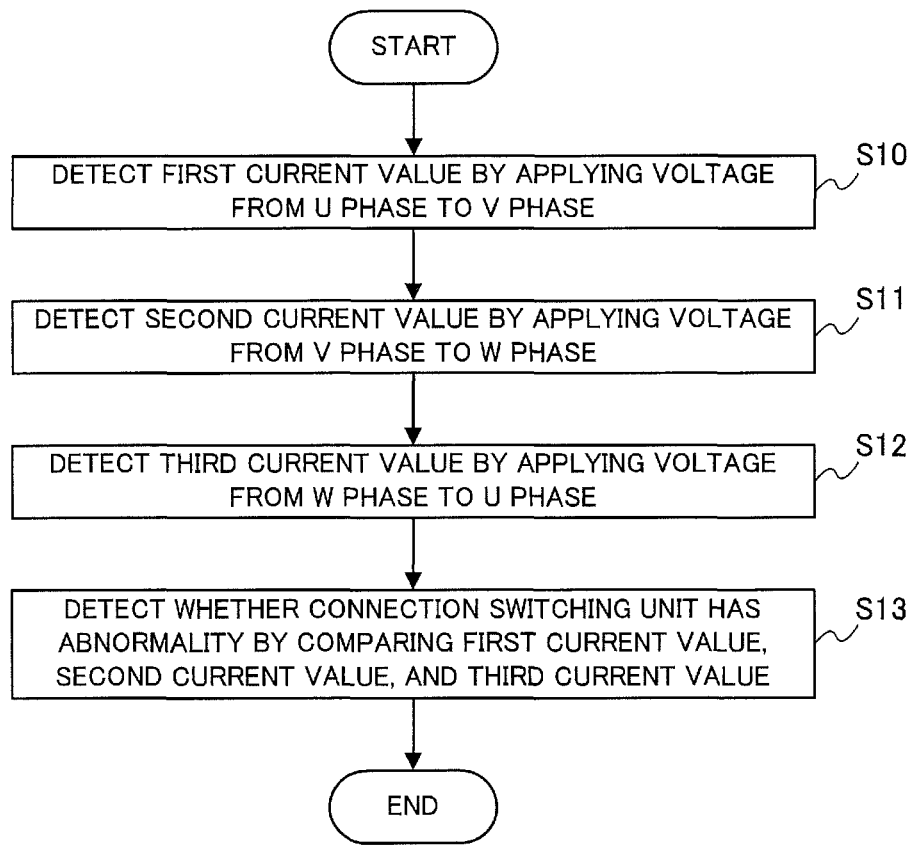

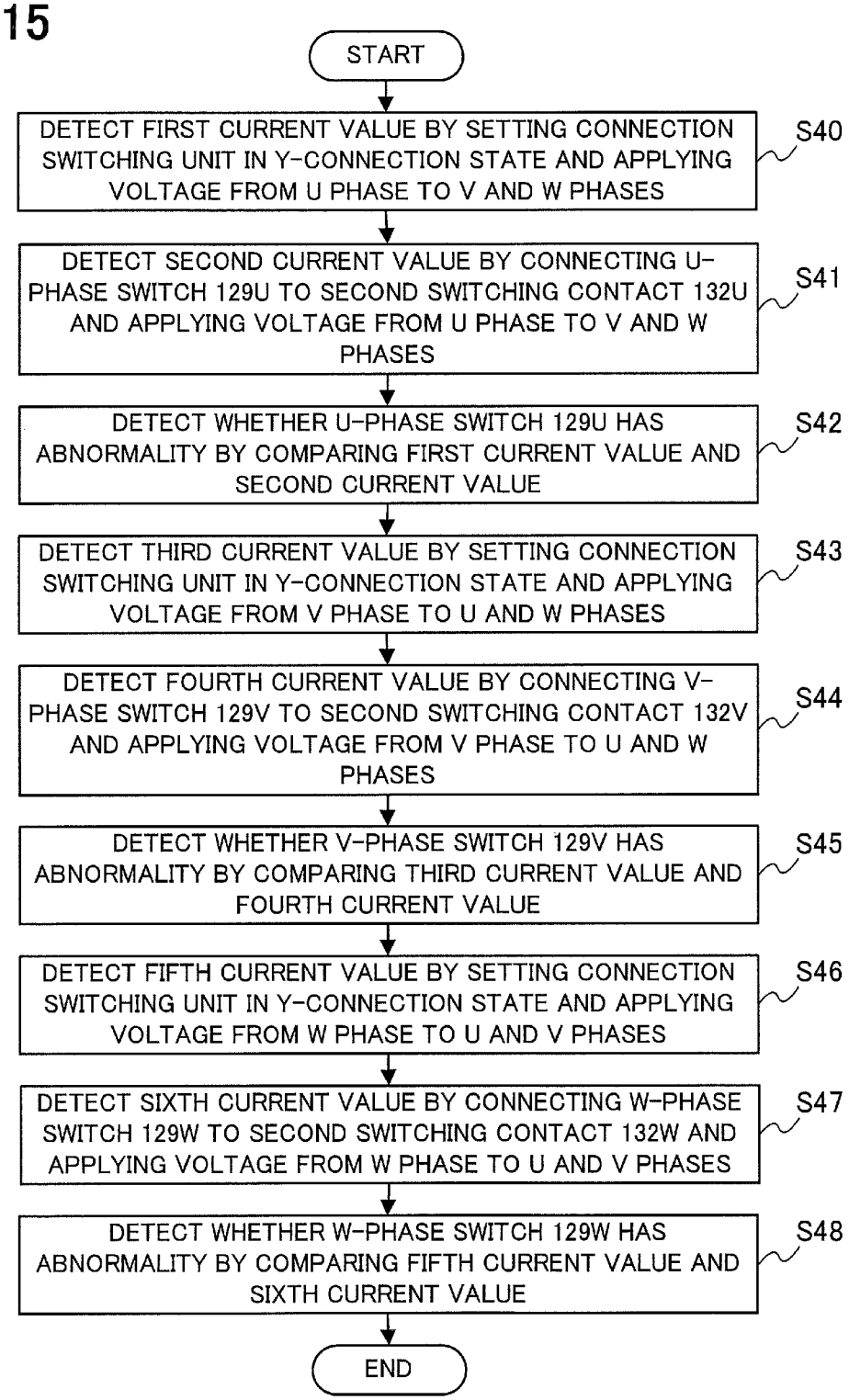

AIR CONDITIONER AND DRIVING DEVICE

CROSS REFERENCE TO RELATED APPLICATION

This application is a U.S. national stage application of International Patent Application No. PCT/JP2016/082210 filed on Oct. 31, 2016, the disclosure of which is incorporated herein by reference.

TECHNICAL FIELD

The present invention relates to an air conditioner and a driving device and, more particularly, to an air conditioner and a driving device which can switch connection states of coils of a motor.

BACKGROUND

A method for efficiently driving a motor by switching connection states such as a Y-connection state and a Δ-connection state in accordance with the rotational speed (load) of the motor has been proposed. For example, for the air conditioning load, by driving the motor in the Y-connection state under an intermediate condition highly contributing to annual power consumption and driving it in the Δ-connection state under a rated condition, it is possible to improve the efficiency for the intermediate condition, in which the load is light, and to get high output for the rated condition, in which high air conditioning capacity is required.

To switch the connection states between the Y-connection state and the Δ-connection state, a connection switching unit that has a mechanical SW (switch) such as a relay and a contactor or a semiconductor SW such as a bidirectional SW is used. The connection states can be switched by controlling the connection switching unit in accordance with a signal from a control unit such as a microcomputer.

When the connection switching unit is broken, this results in abnormal connection condition and extended damage such as system malfunctions or secondary failure may occur.

Patent reference 1 discloses an abnormality diagnosis method for detecting abnormalities of switching elements of an inverter, current detection circuits, and windings by detecting the gradient of the motor current between two phases when the pulses are applied.

PATENT REFERENCE

Patent Reference 1: Japanese Patent Application Publication No. H10-023795

The abnormality diagnosis method disclosed in patent reference 1 can detect a short circuit and the like of the windings themselves, but it cannot detect an abnormality such as a short circuit or opening of the connection switching unit.

SUMMARY

In view of this, it is an object of one or more aspects of the present invention to detect an abnormality of the connection switching unit.

An air conditioner according to one aspect of the present invention is an air conditioner using a refrigeration cycle, the air conditioner including a compressor to compress a refrigerant used in the refrigeration cycle, a converter to generate a DC voltage, an inverter to generate three-phase AC voltages from the DC voltage, a motor to produce a driving force for driving the compressor with a plurality of coils to which the three-phase AC voltages are applied, a connection switching unit to switch connection states of the coils between a first connection state and a second connection state, and a control unit to detect an abnormality of the connection switching unit.

A driving device according to one aspect of the present invention is a driving device for driving a motor including a plurality of coils, the device including a converter to generate a DC voltage, an inverter to generate three-phase AC voltages from the DC voltage and to apply the three-phase AC voltages to the coils, a connection switching unit to switch connection states of the coils between a first connection state and a second connection state, and a control unit to detect an abnormality of the connection switching unit.

According to one or more aspects of the present invention, an abnormality of the connection switching unit can be detected.

BRIEF DESCRIPTION OF THE DRAWINGS

FIG. 4 is a block diagram schematically illustrating a configuration of an indoor unit in Embodiments 1 and 2.

FIGS. 5A and 5B are schematic diagrams illustrating exemplary hardware configurations in Embodiments 1 and 2.

FIG. 6 is a flowchart illustrating an abnormality detection sequence by a controller in Embodiment 1.

FIG. 15 is a flowchart illustrating an abnormality detection sequence by a controller in Embodiment 4.

DETAILED DESCRIPTION

Embodiment 1

Figure 1:
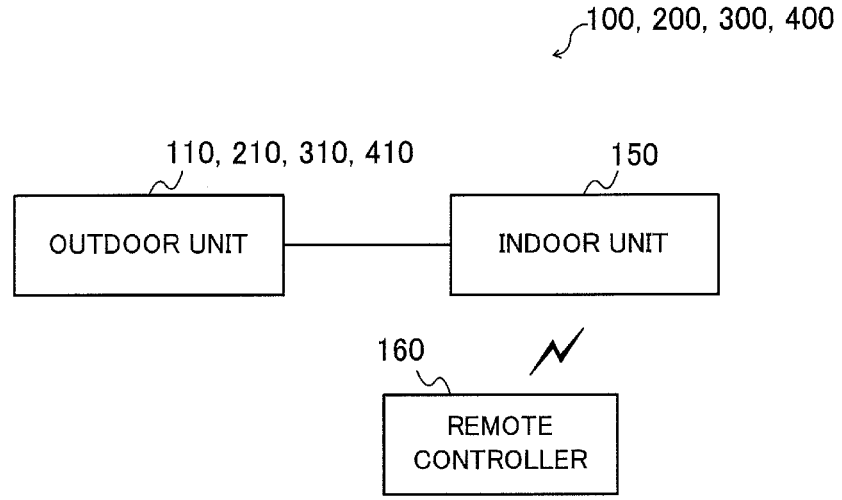
FIG. 1 is a block diagram schematically illustrating a configuration of an air conditioner according to Embodiments 1 to 4.

FIG. 1 is a block diagram schematically illustrating a configuration of an air conditioner 100 using a refrigeration cycle, according to Embodiment 1.

The air conditioner 100 includes an outdoor unit 110 installed outdoors, an indoor unit 150 installed indoors, and a remote controller 160.

Figure 2:
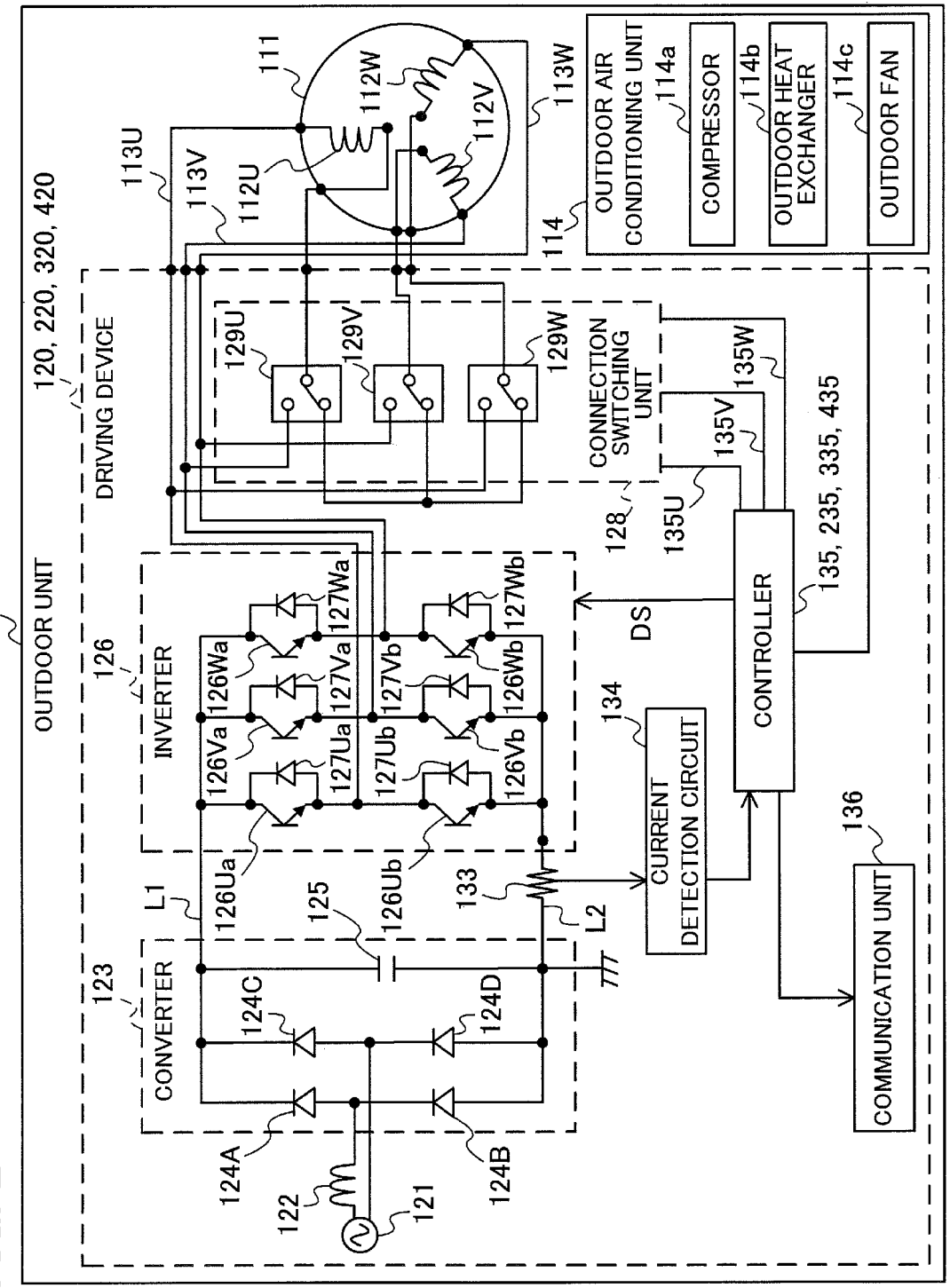
FIG. 2 is a diagram illustrating a schematic configuration of an outdoor unit according to Embodiments 1 to 4.

FIG. 2 is a diagram illustrating a schematic configuration of the outdoor unit 110.

The outdoor unit 110 includes a motor 111, an outdoor air conditioning unit 114, and a driving device 120.

The motor 111 uses a plurality of coils to which three-phase AC voltages from the driving device 120 is applied, to produce a driving force for driving a specific portion included in the outdoor air conditioning unit 114. The motor 111 receives the three-phase AC voltages applied from the driving device 120, via a U-phase power line 113U, a V-phase power line 113V, and a W-phase power line 113W. The motor 111 includes a U-phase coil 112U connected to the U-phase power line 113U, a V-phase coil 112V connected to the V-phase power line 113V, and a W-phase coil 112W connected to the W-phase power line 113W.

The outdoor air conditioning unit 114 performs an outdoor operation in the refrigeration cycle. The outdoor air conditioning unit 114 includes devices such as a compressor 114a, an outdoor heat exchanger 114b, and an outdoor fan 114c.

The compressor 114a obtains the driving force from the motor 111 to compress a refrigerant used in the refrigeration cycle.

The outdoor heat exchanger 114b performs a heat exchange of the refrigerant.

The outdoor fan 114c serves as a fan which blows air to the outdoor heat exchanger 114b for the outdoor unit 110.

The driving device 120 is a device for controlling each part of the outdoor unit 110 and driving the motor 111.

The driving device 120 includes a power supply 121, a reactor 122, a converter 123, an inverter 126, a connection switching unit 128, a current detection circuit 134, a controller 135, and a communication unit 136.

The power supply 121 serves as an AC power supply which outputs an AC voltage.

The converter 123 receives the AC voltage from the power supply 121 via the reactor 122, performs rectifying, smoothing and the like with respect to the AC voltage and thus generates a DC voltage.

The converter 123 includes bridge diodes 124A to 124D which rectify the AC voltage, and a smoothing capacitor 125 which smooths an output voltage.

The inverter 126 receives the DC voltage input from the converter 123, generates three-phase AC voltages from the DC voltage and outputs the generated three-phase AC voltages to the motor 111.

The inverter 126 includes a first U-phase switching element 126Ua, a second U-phase switching element 126Ub, a first V-phase switching element 126Va, a second V-phase switching element 126Vb, a first W-phase switching element 126Wa, and a second W-phase switching element 126Wb which are connected in three phase bridge of the U, V, and W phases.

The first U-phase switching element 126Ua corresponds to a U-phase upper arm, and the second U-phase switching element 126Ub corresponds to a U-phase lower arm. The first U-phase switching element 126Ua and the second U-phase switching element 126Ub are connected to the U-phase power line 113U.

A first U-phase diode 127Ua is connected in parallel with the first U-phase switching element 126Ua, and a second U-phase diode 127Ub is connected in parallel with the second U-phase switching element 126Ub.

The first V-phase switching element 126Va corresponds to a V-phase upper arm, and the second V-phase switching element 126Vb corresponds to a V-phase lower arm. The first V-phase switching element 126Va and the second V-phase switching element 126Vb are connected to the V-phase power line 113V.

A first V-phase diode 127Va is connected in parallel with the first V-phase switching element 126Va, and a second V-phase diode 127Vb is connected in parallel with the second V-phase switching element 126Vb.

The first W-phase switching element 126Wa corresponds to a W-phase upper arm, and the second W-phase switching element 126Wb corresponds to a W-phase lower arm. The first W-phase switching element 126Wa and the second W-phase switching element 126Wb are connected to the W-phase power line 113W.

A first W-phase diode 127Wa is connected in parallel with the first W-phase switching element 126Wa, and a second W-phase diode 127Wb is connected in parallel with the second W-phase switching element 126Wb.

Each of the switching elements 126Ua to 126Wb can be implemented as a transistor such as IGBT (Insulated Gate Bipolar Transistor).

ON or OFF of each of the switching elements 126Ua to 126Wb is controlled in accordance with driving signals DS from the controller 135.

The connection switching unit 128 switches the connection states of the plurality of coils of the motor 111 between a first connection state and a second connection state. The second connection state is defined herein as a state in which the line voltage of the inverter 126 is lower than that in the first connection state. For example, the first connection state is defined as the Y-connection state, and the second connection state is defined as the Δ-connection state.

The connection switching unit 128 includes a U-phase switch 129U, a V-phase switch 129V, and a W-phase switch 129W.

The U-phase switch 129U serves as a switching unit which switches the connection destination of the U-phase coil 112U.

The V-phase switch 129V serves as a switching unit which switches the connection destination of the V-phase coil 112V.

The W-phase switch 129W serves as a switching unit which switches the connection destination of the W-phase coil 112W.

Figure 3:
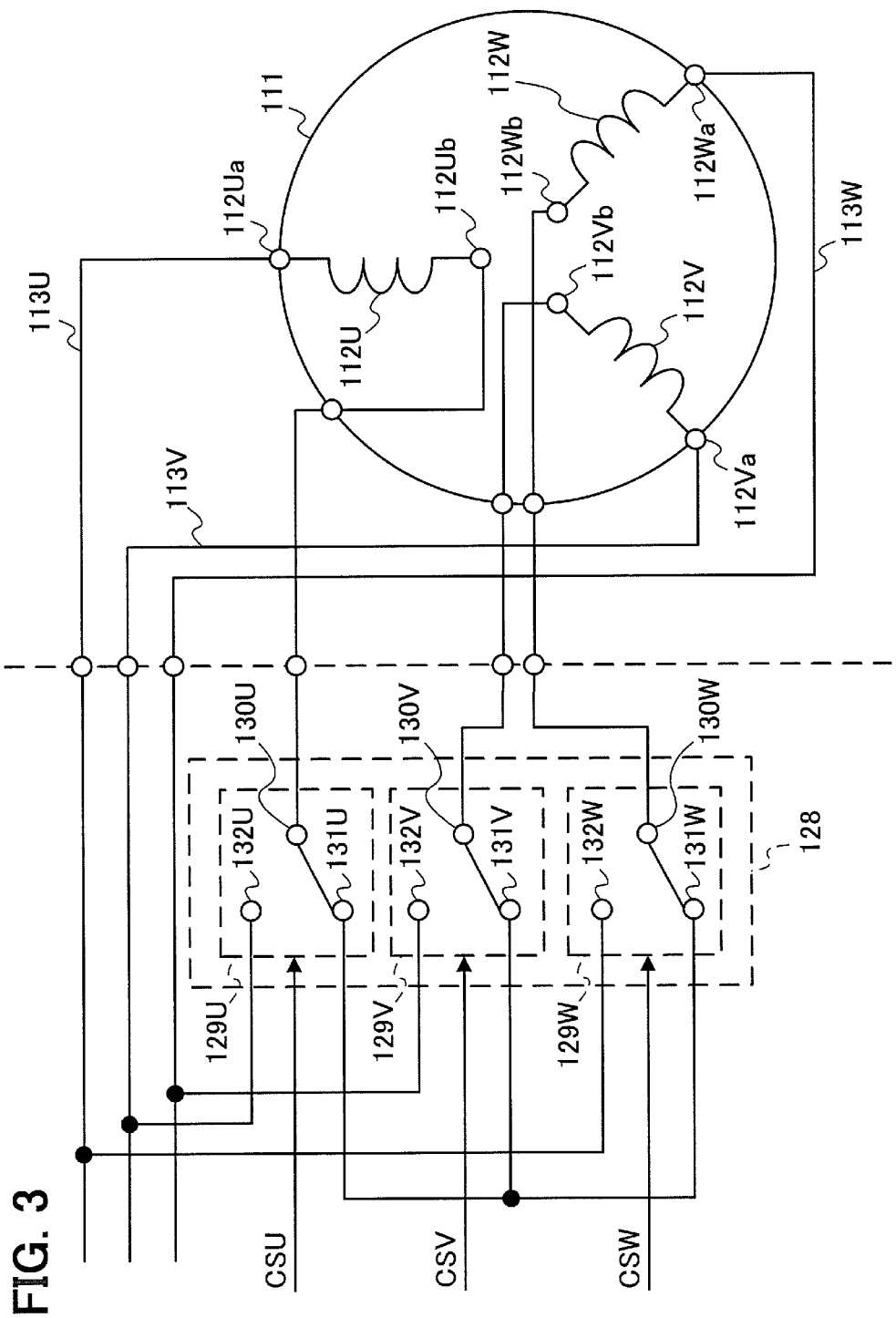
FIG. 3 is a schematic diagram illustrating a first example of the connection state between a motor and a connection switching unit in Embodiment 1.

FIG. 3 is a schematic diagram illustrating the connection state between the motor 111 and the connection switching unit 128.

The U-phase coil 112U has one end 112Ua connected to the U-phase power line 113U and the other end 112Ub connected to a common contact 130U of the U-phase switch 129U.

A first switching contact 131U of the U-phase switch 129U is connected to a first switching contact 131V of the V-phase switch 129V and a first switching contact 131W of the W-phase switch 129W.

A second switching contact 132U of the U-phase switch 129U is connected to the V-phase power line 113V.

The U-phase switch 129U can switch connections to the common contact 130U between the first switching contact 131U and the second switching contact 132U.

The V-phase coil 112V has one end 112Va connected to the V-phase power line 113V and the other end 112Vb connected to a common contact 130V of the V-phase switch 129V.

The first switching contact 131V of the V-phase switch 129V is connected to the first switching contact 131U of the U-phase switch 129U and the first switching contact 131W of the W-phase switch 129W.

A second switching contact 132V of the V-phase switch 129V is connected to the W-phase power line 113W.

The V-phase switch 129V can switch connections to the common contact 130V between the first switching contact 131V and the second switching contact 132V.

The W-phase coil 112W has one end 112Wa connected to the W-phase power line 113W and the other end 112Wb connected to a common contact 130W of the W-phase switch 129W.

The first switching contact 131W of the W-phase switch 129W is connected to the first switching contact 131U of the U-phase switch 129U and the first switching contact 131V of the V-phase switch 129V.

A second switching contact 132W of the W-phase switch 129W is connected to the U-phase power line 113U.

The W-phase switch 129W can switch connections to the common contact 130W between the first switching contact 131W and the second switching contact 132W.

Since the connection switching unit 128 is configured as above, the motor 111 can be set in the Y-connection state in which the other end 112Ub of the U-phase coil 112U, the other end 112Vb of the V-phase coil 112V, and the other end 112Wb of the W-phase coil 112W are connected to each other, by connecting the common contact 130U to the first switching contact 131U in the U-phase switch 129U, connecting the common contact 130V to the first switching contact 131V in the V-phase switch 129V, and connecting the common contact 130W to the first switching contact 131W in the W-phase switch 129W.

The motor 111 can be set in the Δ-connection state in which the end 112Ua of the U-phase coil 112U and the other end 112Wb of the W-phase coil 112W are connected to the U-phase power line 113U, the end 112Va of the V-phase coil 112V and the other end 112Ub of the U-phase coil 112U are connected to the V-phase power line 113V, and the end 112Wa of the W-phase coil 112W and the other end 112Vb of the V-phase coil 112V are connected to the W-phase power line 113W, by connecting the common contact 130U to the second switching contact 132U in the U-phase switch 129U, connecting the common contact 130V to the second switching contact 132V in the V-phase switch 129V, and connecting the common contact 130W to the second switching contact 132W in the W-phase switch 129W.

The U-phase switch 129U, the V-phase switch 129V, and the W-phase switch 129W can individually switch the connection destinations of the common contacts 130U to 130W between the first switching contacts 131U to 131W and the second switching contacts 132U to 132W in accordance with switching signals CSU, CSV, and CSW from the controller 135.

The U-phase switch 129U, the V-phase switch 129V, and the W-phase switch 129W are specified as c-contact switches, but they are not limited to such an example. The U-phase switch 129U, the V-phase switch 129V, and the W-phase switch 129W need only be implemented as bidirectionally openable and closable switches. For example, each of the U-phase switch 129U, the V-phase switch 129V, and the W-phase switch 129W may be implemented as a combination of a-contact switches or a combination of b-contact switches, or may be implemented as a semiconductor switch.

For the U-phase switch 129U, the V-phase switch 129V, and the W-phase switch 129W, a switch of a low conduction loss in turn-on is preferable and mechanical switches such as relays or contactors can be used. However, the use of switching elements employing a WBG (Wide Band Gap) semiconductor such as SiC or GaN as these switches allows low ON resistances, low losses, and less element heat generation. Especially when the connection states are switched during driving, these switches are preferably made up of semiconductors.

A structure in which the connection state is the Y-connection state when a normally-on element of the semiconductor is ON-state can reduce the loss on the light load (Y-connection), and the structure suitable for the air conditioner 100 which has a high contribution rate in the light load.

To return to FIG. 2, when the inverter 126 is switched, a shunt resistor 133 converts a current flowing through buses L1 and L2 into a voltage proportional to the current and transmits the voltage to the current detection circuit 134.

The current detection circuit 134 serves as a current detection unit which detects the value of the current on the input side of the inverter 126. In Embodiment 1, the current detection circuit 134 detects the value of the bus current (input current) of the inverter 126, but the detection of the current value is not limited to such an example. For example, the value of the current on the input side of the inverter 126 may be calculated by using the phase current of the inverter 126.

The controller 135 serves as a control unit which controls each part of the outdoor unit 110. The controller 135 controls, in particular, the outdoor air conditioning unit 114, the inverter 126, and the connection switching unit 128.

The controller 135 detects an abnormality of the connection switching unit 128. For example, the controller 135 controls the inverter 126 and the connection switching unit 128, and detects an abnormality of the connection switching unit 128, based on the current value detected by the current detection circuit 134. For example, the controller 135. A method for detecting an abnormality by the controller 135 will be described later.

When the controller 135 detects an abnormality of the connection switching unit 128, it notifies the indoor unit 150 that the abnormality has been detected, via the communication unit 136.

The controller 135 can individually control the U-phase switch 129U, the V-phase switch 129V, and the W-phase switch 129W. For example, the controller 135 is connected to the connection switching unit 128 with three control lines which are a U-phase control line 135U for controlling the U-phase switch 129U, a V-phase control line 135V for controlling the V-phase switch 129V, and a W-phase control line 135W for controlling the W-phase switch 129W. The controller 135 can control switching of the U-phase switch 129U by transmitting a U-phase switching signal CSU for controlling the U-phase switch 129U to the U-phase switch 129U through the U-phase control line 135U. Similarly, the controller 135 can control switching of each of the V-phase switch 129V and the W-phase switch 129W by transmitting a V-phase switching signal CSV to the V-phase switch 129V through the V-phase control line 135V and transmitting a W-phase switching signal CSW to the W-phase switch 129W through the W-phase control line 135W.

The communication unit 136 communicates with the indoor unit 150. For example, the communication unit 136 transmits a notification signal indicating that an abnormality of the connection switching unit 128 has been detected, to the indoor unit 150 in accordance with an instruction from the controller 135.

When the outdoor unit 110 is connected to the indoor unit 150 with three lines, and no communication line is included, the communication unit 136 performs communication with power lines. When the outdoor unit 110 is connected to the indoor unit 150 with four lines, and a communication line is included, the communication unit 136 performs communication with the communication line. The connection between the outdoor unit 110 and the indoor unit 150 may be wireless connection or connection with a dedicated wire and the like, and the communication unit 136 may perform communication using such connection.

FIG. 4 is a block diagram schematically illustrating a configuration of the indoor unit 150 in Embodiment 1.

The indoor unit 150 includes an indoor air conditioning unit 151, a first communication unit 152, a second communication unit 153, a display unit 154, and a control unit 155.

The indoor air conditioning unit 151 performs an indoor operation in the refrigeration cycle. The indoor air conditioning unit 151 includes devices such as an indoor heat exchanger 151a and an indoor fan 151b.

The indoor heat exchanger 151a performs heat exchange of the refrigerant.

The indoor fan 151b serves as a fan which blows air to the indoor heat exchanger 151a for the indoor unit 150.

The first communication unit 152 communicates with the outdoor unit 110.

The second communication unit 153 communicates with the remote controller 160 or a smartphone 161 serving as a user terminal.

The display unit 154 displays the content of instructions issued from the control unit 155.

The control unit 155 controls each part of the indoor unit 150.

The control unit 155 notifies a user that an abnormality of the connection switching unit 128 has been detected, when the first communication unit 152 receives the notification signal from the outdoor unit 110. For example, the control unit 155 notifies the user by performing at least one of display on the display unit 154, display on the remote controller 160, and display on the smartphone 161.

More specifically, the control unit 155 instructs the display unit 154 to display information indicating that the abnormality of the connection switching unit 128 has been detected.

The control unit 155 can also cause the remote controller 160 to display information indicating that the abnormality of the connection switching unit 128 has been detected, by causing the second communication unit 153 to transmit, to the remote controller 160, a specific signal indicating that the abnormality of the connection switching unit 128 has been detected. In this case, the second communication unit 153 can be implemented by, for example, a communication interface using infrared rays.

The control unit 155 can even cause the smartphone 161 to display information indicating that the abnormality of the connection switching unit 128 has been detected, by causing the second communication unit 153 to transmit, to the smartphone 161, notification data indicating that the abnormality of the connection switching unit 128 has been detected. In this case, the second communication unit 153 can be implemented by a wireless LAN (Local Area Network) communication interface.

The remote controller 160 functions as an input reception unit which receives input of various instructions. For example, the remote controller 160 receives input to start the operation of the air conditioner 100. The smartphone 161 may function as the input reception unit.

Part or the whole of the controller 135 of the outdoor unit 110 and the control unit 155 of the indoor unit 150 described above can be implemented by, for example, a memory 10, and a processor 11 such as a CPU (Central Processing Unit) which executes a program stored in the memory 10, as illustrated in FIG. 5(A). The program may be provided via a network or with a recording medium recording the program.

Part or the whole of the controller 135 and the control unit 155 can also be implemented by, for example, a processing circuit 12 such as a single circuit, a complex circuit, a programmed processor, a parallel-programmed processor, ASICs (Application Specific Integrated Circuits), or an FPGA (Field Programmable Gate Array), as illustrated in FIG. 5(B).

An operation for detecting an abnormality of the connection switching unit 128 by the controller 135 of the outdoor unit 110 will be described below.

FIG. 6 is a flowchart illustrating an abnormality detection sequence by the controller 135 in Embodiment 1.

Assume herein that the connection switching unit 128 is set in a Y-connection state or a Δ-connection state.

First, the controller 135 obtains, as a first current value, a current value detected by the current detection circuit 134 when a voltage is applied to only the U-phase power line 113U and the V-phase power line 113V (S10). For example, the controller 135 applies a voltage to only the U-phase power line 113U and the V-phase power line 113V by transmitting driving signals DS to the inverter 126 to turn on only the first U-phase switching element 126Ua and the second V-phase switching element 126Vb. In this case, for example, as illustrated in FIG. 2, when the connection switching unit 128 is in the Y-connection state, if the connection switching unit 128 has no abnormality, a current flows through the U-phase coil 112U and the V-phase coil 112V. The value of the bus current in this case is detected as the first current value.

Then, the controller 135 obtains, as a second current value, a current value detected by the current detection circuit 134 when a voltage is applied to only the V-phase power line 113V and the W-phase power line 113W (S11). For example, the controller 135 applies a voltage to only the V-phase power line 113V and the W-phase power line 113W by transmitting driving signals DS to the inverter 126 to turn on only the first V-phase switching element 126Va and the second W-phase switching element 126Wb. In this case, for example, as illustrated in FIG. 2, when the connection switching unit 128 is in the Y-connection state, if the connection switching unit 128 has no abnormality, a current flows through the V-phase coil 112V and the W-phase coil 112W. The value of the bus current in this case is detected as the second current value.

The controller 135 obtains as a third current value, a current value detected by the current detection circuit 134 when a voltage is applied to only the W-phase power line 113W and the U-phase power line 113U (S12). For example, the controller 135 applies a voltage to only the W-phase power line 113W and the U-phase power line 113U by transmitting driving signals DS to the inverter 126 to turn on only the first W-phase switching element 126Wa and the second U-phase switching element 126Ub. In this case, for example, as illustrated in FIG. 2, when the connection switching unit 128 is in the Y-connection state, if the connection switching unit 128 has no abnormality, a current flows through the W-phase coil 112W and the U-phase coil 112U. The value of the bus current in this case is detected as the third current value.

The controller 135 detects the presence or absence of an abnormality of the connection switching unit 128 by comparing the first current value, the second current value, and the third current value (S13).

A method for detecting the presence or absence of an abnormality of the connection switching unit 128 by the controller 135 will be described below with reference to FIGS. 7 to 10.

The case where the connection switching unit 128 is in the Y-connection state, as illustrated in FIG. 2, and has no abnormality will be described below with reference to FIG. 7.

Symbols in FIG. 7 will be described here.

Symbol UP denotes a driving signal DS for the first U-phase switching element 126Ua; symbol VP denotes a driving signal DS for the first V-phase switching element 126Va; and symbol WP denotes a driving signal DS for the first W-phase switching element 126Wa.

Symbol UN denotes a driving signal DS for the second U-phase switching element 126Ub; symbol VN denotes a driving signal DS for the second V-phase switching element 126Vb; and symbol WN denotes a driving signal DS for the second W-phase switching element 126Wb.

Symbol Iu denotes a current value of the U-phase power line 113U assuming that the direction from the inverter 126 to the motor 111 is positive; symbol Iv denotes a current value of the V-phase power line 113V assuming that the direction from the inverter 126 to the motor 111 is positive; and symbol Iw denotes a current value of the W-phase power line 113W assuming that the direction from the inverter 126 to the motor 111 is positive.

Symbol I denotes the value of the bus current detected by the current detection circuit 134.

Figure 7:
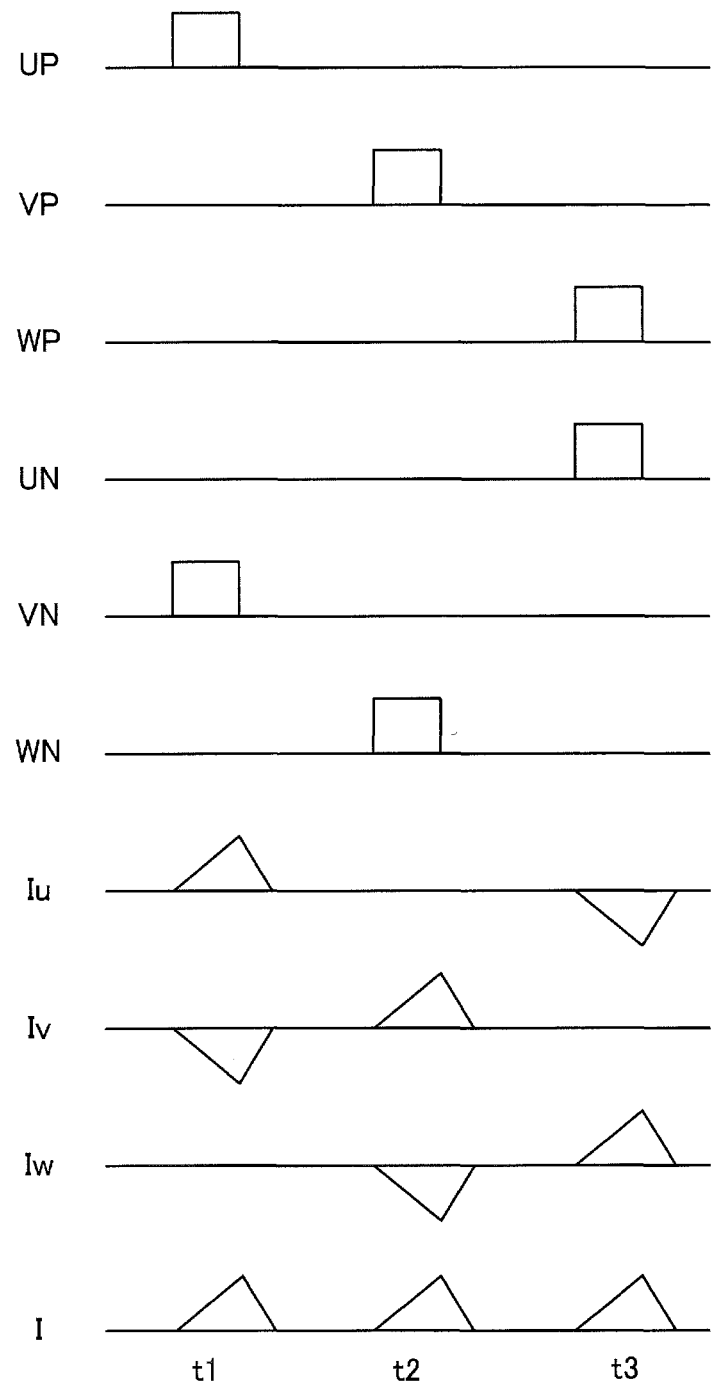
FIG. 7 is a schematic diagram illustrating a first example of driving signals for an inverter, interphase currents, and a bus current in Embodiment 1.

As illustrated in FIG. 7, when the first U-phase switching element 126Ua and the second V-phase switching element 126Vb are turned on at time t1, a current flows through the U-phase coil 112U and the V-phase coil 112V, and the current detection circuit 134 detects the current as the first current value.

When the first V-phase switching element 126Va and the second W-phase switching element 126Wb are turned on at time t2, a current flows through the V-phase coil 112V and the W-phase coil 112W, and the current detection circuit 134 detects the current as the second current value.

When the first W-phase switching element 126Wa and the second U-phase switching element 126Ub are turned on at time t3, a current flows through the W-phase coil 112W and the U-phase coil 112U, and the current detection circuit 134 detects the current as the third current value.

The first current value, the second current value, and the third current value may be peak or average values.

As illustrated in FIG. 7, when the connection switching unit 128 has no abnormality, the first current value, the second current value, and the third current value are nearly equal values.

Figure 8:
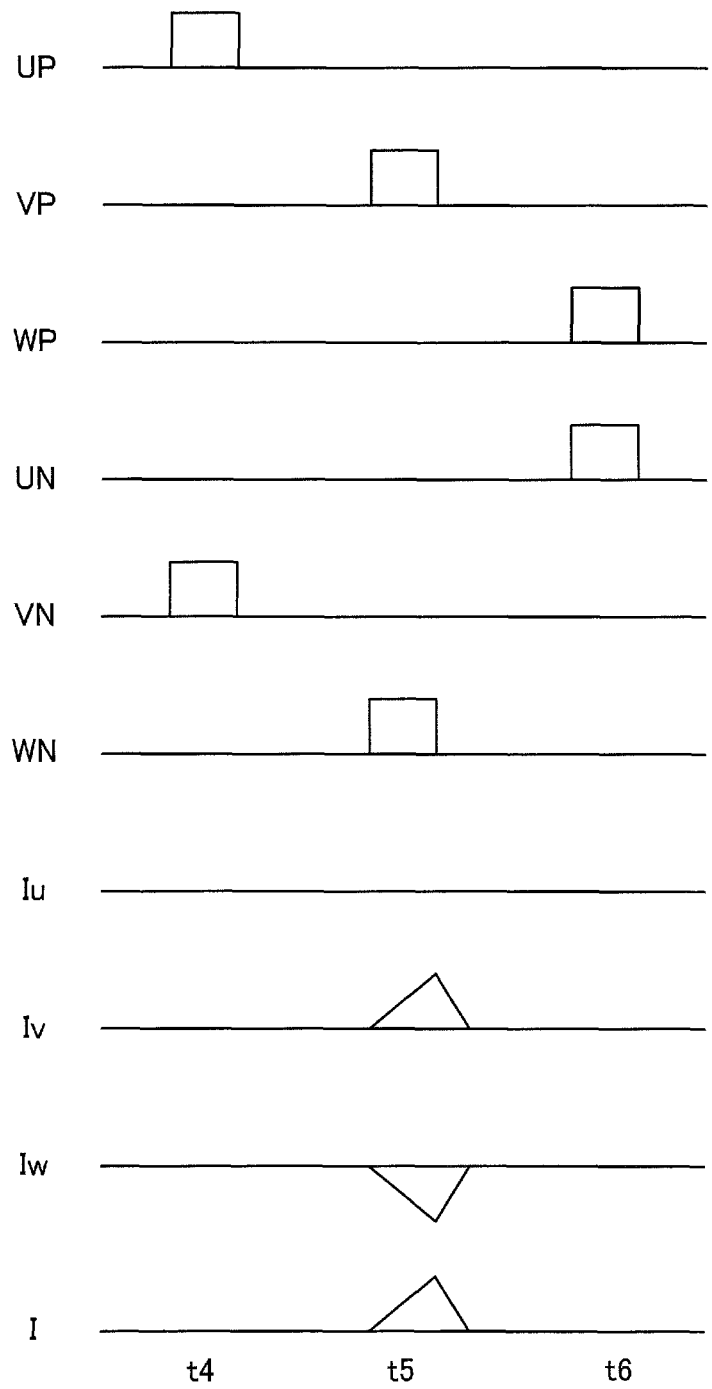
FIG. 8 is a schematic diagram illustrating a second example of driving signals for the inverter, interphase currents, and a bus current in Embodiment 1.

A first case where the connection switching unit 128 is in the Y-connection state, as illustrated in FIG. 2, and has an abnormality will be described below with reference to FIG. 8. FIG. 8 illustrates that the U-phase switch 129U has opening failure.

Symbols in FIG. 8 are the same as those in FIG. 7.

As illustrated in FIG. 8, even when the first U-phase switching element 126Ua and the second V-phase switching element 126Vb are turned on at time t4, if the U-phase switch 129U is open, no current flows through the U-phase coil 112U and the V-phase coil 112V. Accordingly, the current detection circuit 134 does not detect the first current value.

When the first V-phase switching element 126Va and the second W-phase switching element 126Wb are turned on at time t5, a current flows through the V-phase coil 112V and the W-phase coil 112W, and the current detection circuit 134 detects the current as the second current value.

Even when the first W-phase switching element 126Wa and the second U-phase switching element 126Ub are turned on at time t6, if the U-phase switch 129U is open, no current flows through the W-phase coil 112W and the U-phase coil 112U. Accordingly, the current detection circuit 134 does not detect the third current value.

Hence, as illustrated in FIG. 8, when the connection switching unit 128 has opening failure, two of the first current value, the second current value, and the third current value are not detected.

Figure 9:
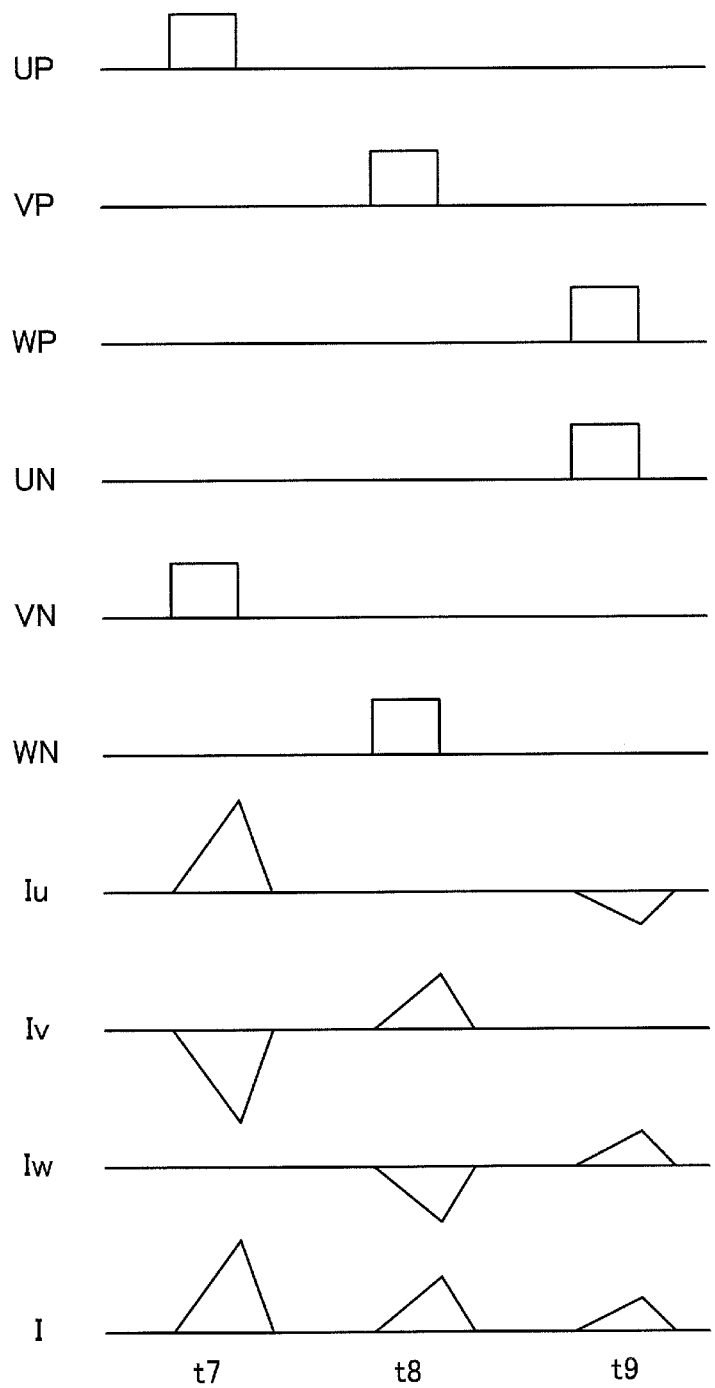
FIG. 9 is a schematic diagram illustrating a third example of driving signals for the inverter, interphase currents, and a bus current in Embodiment 1.
Figure 10:
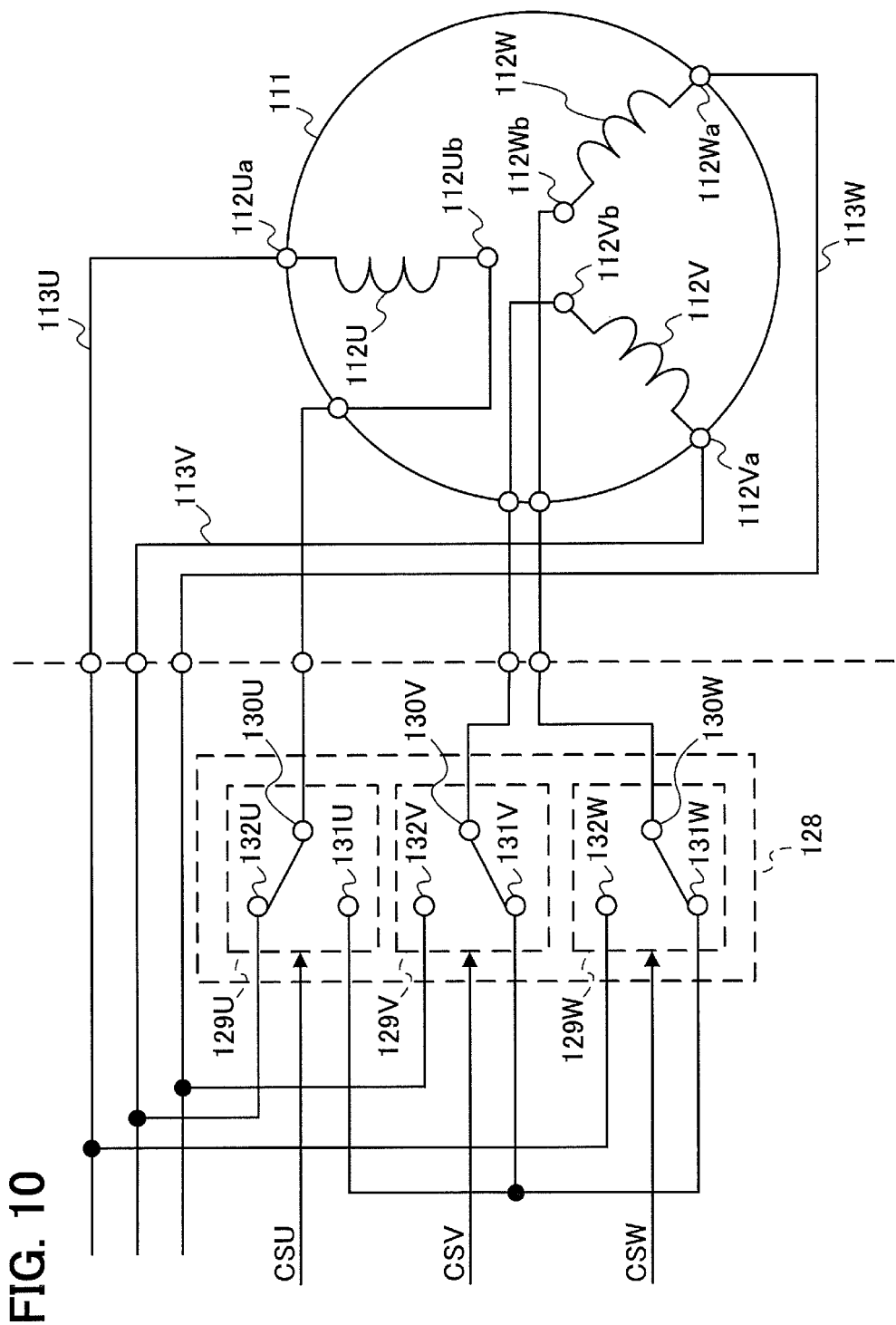
FIG. 10 is a schematic diagram illustrating a second example of the connection state between the motor and the connection switching unit in Embodiment 1.

A second case where the connection switching unit 128 is in the Y-connection state, as illustrated in FIG. 2, and has an abnormality will be described below with reference to FIG. 9. FIG. 9 illustrates that the U-phase switch 129U has short-circuit failure on the side of the second switching contact 132U, as illustrated in FIG. 10.

Symbols in FIG. 9 are the same as those in FIG. 7.

As illustrated in FIG. 9, when the first U-phase switching element 126Ua and the second V-phase switching element 126Vb are turned on at time t7, if the U-phase switch 129U has short-circuited on the side of the second switching contact 132U, a current flows through the U-phase coil 112U while no current flows through the V-phase coil 112V. Accordingly, the current detection circuit 134 detects the current value obtained when a current flows through only the U-phase coil 112U as the first current value.

When the first V-phase switching element 126Va and the second W-phase switching element 126Wb are turned on at time t8, a current flows through the V-phase coil 112V and the W-phase coil 112W, and the current detection circuit 134 detects the current as the second current value.

When the first W-phase switching element 126Wa and the second U-phase switching element 126Ub are turned on at time t9, if the U-phase switch 129U has short-circuited on the side of the second switching contact 132U, a current flows through the W-phase coil 112W and the U-phase coil 112U and also flows through the V-phase coil 112V. Accordingly, the current detection circuit 134 detects the current value obtained when a current flows through the U-phase coil 112U, the V-phase coil 112V, and the W-phase coil 112W as the third current value.

Hence, as illustrated in FIG. 9, when the connection switching unit 128 has short-circuit failure, at least one of the first current value, the second current value, and the third current value is detected as a value different from another one.

As described above, the controller 135 compares the first current value, the second current value, and the third current value with each other. Therefore, for example, it is possible to determine that the connection switching unit 128 has no abnormality if the absolute values of the differences between these values are equal to or smaller than a predetermined threshold, and determine that the connection switching unit 128 has an abnormality if the absolute values of the differences between these values are larger than the predetermined threshold or if there is any current value that cannot be detected in these values.

Although pulse signals are used as the driving signals DS for the inverter 126 in FIGS. 7 to 9, the use of, for example, PWM signals having a fixed duty ratio as the driving signals DS allows the current detection circuit 134 to detect current values which depend not on the inductances of the U-phase coil 112U, the V-phase coil 112V, and the W-phase coil 112W, but on the resistances. In this case, the first current value, the second current value, and the third current value are desirably average values.

In the flowchart illustrated in FIG. 6, the first current value is detected by applying a voltage to the U-phase power line 113U and the V-phase power line 113V, the second current value is detected by applying a voltage to the V-phase power line 113V and the W-phase power line 113W, and the third current value is detected by applying a voltage to the W-phase power line 113W and the U-phase power line 113U, but this Embodiment is not limited to such an example. For example, one of the U-phase power line 113U, the V-phase power line 113V, and the W-phase power line 113W is set as a first line, another is set as a second line, and the other is set as a third line. the first current value may be detected by applying a voltage to only the first line and the second line by the inverter 126, the second current value may be detected by applying a voltage to only the second line and the third line by the inverter 126, and the third current value may be detected by applying a voltage to only the third line and the first line by the inverter 126.

In such a case, a coil (112U, 112V, or 112W) having one end (112Ua, 112Va, or 112Wa) connected to the first line is set as a first coil, a coil (112U, 112V, or 112W) having one end (112Ua, 112Va, or 112Wa) connected to the second line is set as a second coil, and a coil (112U, 112V, or 112W) having one end (112Ua, 112Va, or 112Wa) connected to the third line is set as a third coil.

A switch (129U, 129V, or 129W) which switches the connection destination of the other end (112Ub, 112Vb, or 112Wb) of the first coil is set as a first switching unit, a switch (129U, 129V, or 129W) which switches the connection destination of the other end (112Ub, 112Vb, or 112Wb) of the second coil is set as a second switching unit, and a switch (129U, 129V, or 129W) which switches the connection destination of the other end (112Ub, 112Vb, or 112Wb) of the third coil is set as a third switching unit.

When the controller 135 detects an abnormality of the connection switching unit 128, it can notify a user and take measures according to the failure mode. When, for example, the connection switching unit 128 has opening failure, the controller 135 stops (halts) the operation of the air conditioner 100. When the connection switching unit 128 has short-circuit failure at a switching contact on the Y-connection side, the controller 135 drives the air conditioner 100 in the Y-connection state. When the connection switching unit 128 has short-circuit failure at a switching contact on the Δ-connection side, the controller 135 drives the air conditioner 100 in the Δ-connection state. By such driving, the air conditioner 100 can even wait for repair by support, while continuing its operation.

Next, the timing of performing an abnormality detection sequence by the controller 135 will be described.

When the connection switching unit 128 is broken, this results in an abnormal connection state, and other circuits may also be broken due to over current, excessive heat generation, or the like. When one continues the operation without being aware of step-out, the compressor 114a may stall.

Hence, the controller 135 desirably executes the abnormality detection sequence before the compressor 114a is started.

Figure 11:
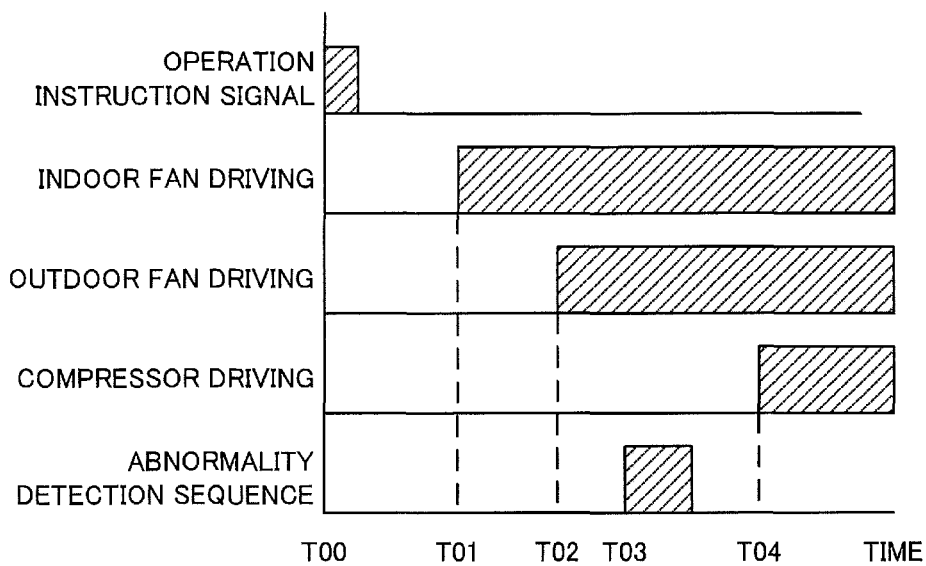
FIG. 11 is a timing chart for explaining a first timing of performing an abnormality detection sequence in Embodiment 1.

For example, as illustrated in FIG. 11, when an operation instruction signal from the remote controller 160 is input to the indoor unit 150 (T00), the indoor fan 151b starts to be driven (T01), the outdoor fan 114c of the outdoor unit 110 starts to be driven (T02), and the compressor 114a of the outdoor unit 110 is driven (T04). In this case, the controller 135 desirably executes an abnormality detection sequence at time T03 between time T02 and time 104.

The remote controller 160 receives from a user input to start the operation of the air conditioner 100 and then transmits an operation instruction signal to the indoor unit 150.

In this way, lengthening the start-up time of the compressor 114a can be suppressed. An abnormality detection sequence can be executed at any timing with no problem as long as this is done before the start-up of the compressor 114a, but in order not to hear much noise, this is done desirably after the start of driving the indoor fan 151b and more desirably after the start of driving the outdoor fan 114c. This can keep the volume of a sound generated by the abnormality detection sequence relatively low among unit driving sounds.

Figure 12:
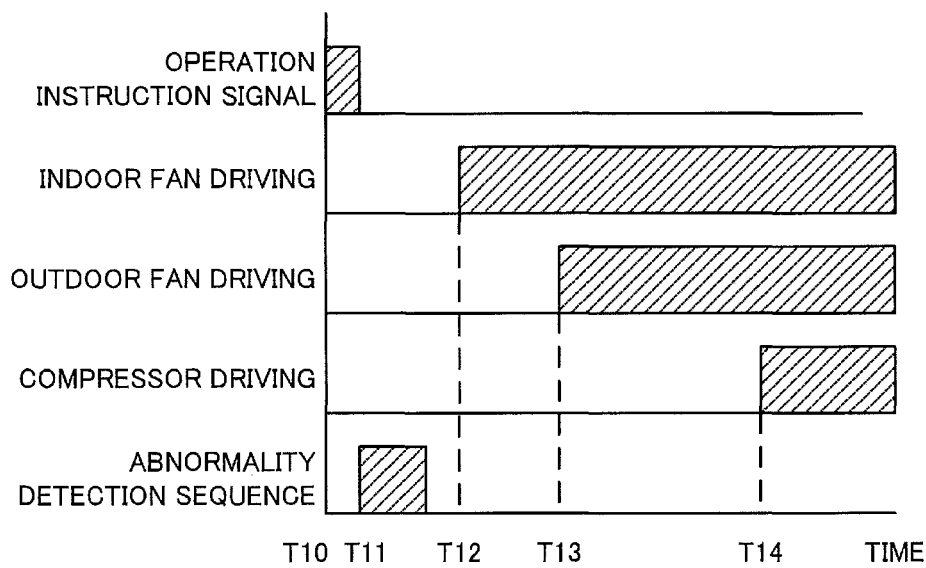
FIG. 12 is a timing chart for explaining a second timing of performing an abnormality detection sequence in Embodiment 1.

As illustrated in FIG. 12, in the case where an operation instruction signal from the remote controller 160 is input to the indoor unit 150 (T10), the indoor fan 151b starts to be driven (T12), the outdoor fan 114c of the outdoor unit 110 starts to be driven (T13), and the compressor 114a of the outdoor unit 110 is driven (T14), the abnormality detection sequence may be executed immediately after the operation instruction signal from the remote controller 160 is input to the indoor unit 150. More specifically, the abnormality detection sequence may be executed in response to the reception, by the remote controller 160, of input to start the operation of the air conditioner 100 from the user. This makes it possible to detect an abnormal state and notify a user while the user focuses on the remote controller 160 or the indoor unit 150.

As described above, according to Embodiment 1, an abnormality of the connection switching unit 128 can be easily detected.

Embodiment 2

An air conditioner 200 according to Embodiment 2 includes an outdoor unit 210, an indoor unit 150, and a remote controller 160, as illustrated in FIG. 1.

The indoor unit 150 and the remote controller 160 of the air conditioner 200 according to Embodiment 2 are the same as the indoor unit 150 and the remote controller 160 according to Embodiment 1.

The outdoor unit 210 according to Embodiment 2 includes a motor 111, an outdoor air conditioning unit 114, and a driving device 220, as illustrated in FIG. 2.

The motor 111 and the outdoor air conditioning unit 114 of the outdoor unit 210 according to Embodiment 2 are the same as the motor 111 and the outdoor air conditioning unit 114 according to Embodiment 1.

The driving device 220 in Embodiment 2 includes a power supply 121, a reactor 122, a converter 123, an inverter 126, a connection switching unit 128, a shunt resistor 133, a current detection circuit 134, a controller 235, and a communication unit 136.

The driving device 220 in Embodiment 2 is the same as the driving device 120 in Embodiment 1, except for the controller 235.

The controller 235 in Embodiment 2 serves as a control unit which controls each part of the outdoor unit 210. The controller 235 controls, in particular, the outdoor air conditioning unit 114, the inverter 126, and the connection switching unit 128.

The controller 235 in Embodiment 2 is different from the controller 135 in Embodiment 1 in terms of the sequence of detecting an abnormality of the connection switching unit 128 by controlling the inverter 126 and the connection switching unit 128.

Figure 13:
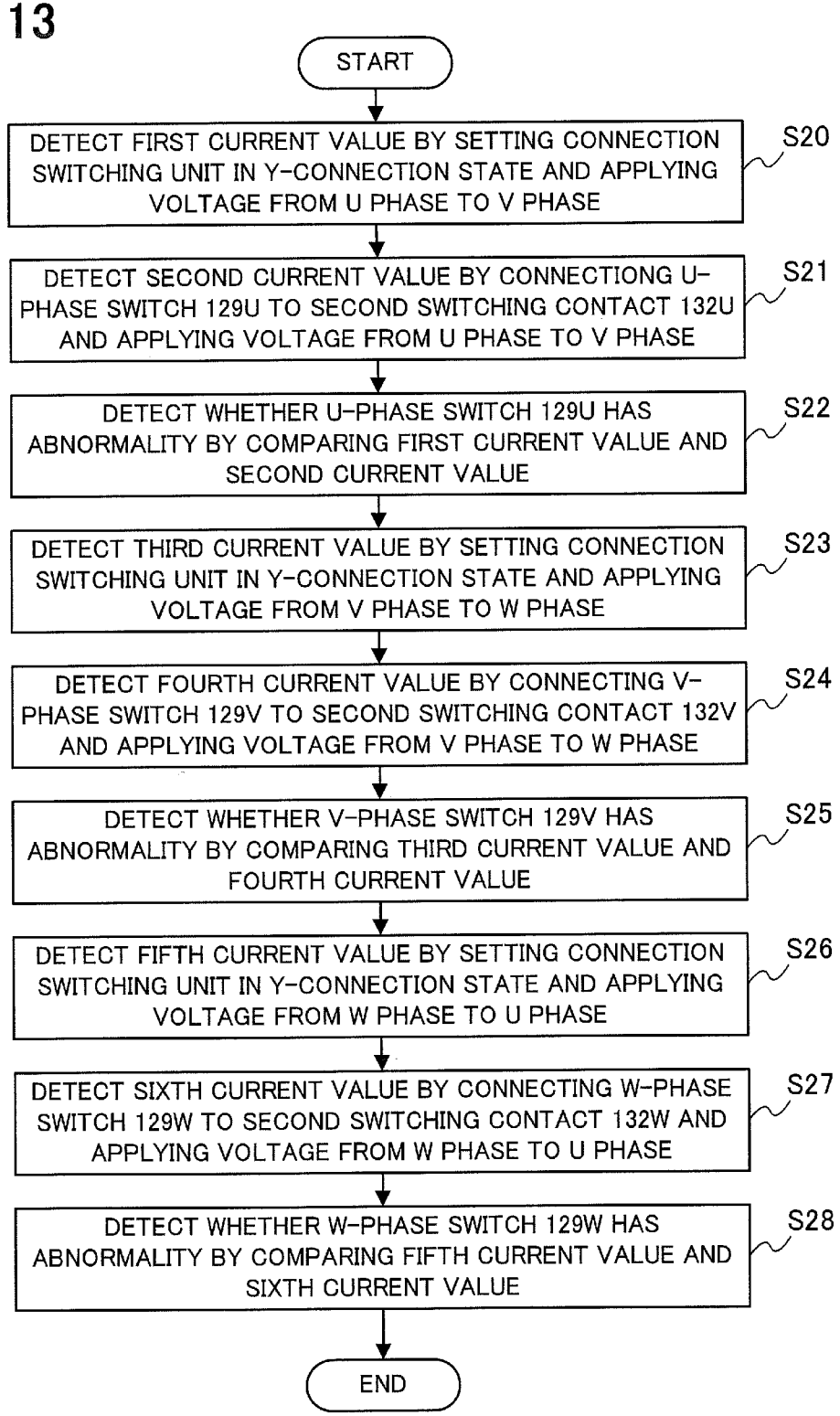
FIG. 13 is a flowchart illustrating an abnormality detection sequence by a controller in Embodiment 2.

FIG. 13 is a flowchart illustrating an abnormality detection sequence by the controller 235 in Embodiment 2.

First, the controller 235 obtains, as a first current value, a current value detected by the current detection circuit 134 when the connection switching unit 128 is set in the Y-connection state and a voltage is applied to only the U-phase power line 113U and the V-phase power line 113V (S20).

Then, the controller 235 obtains, as a second current value, a current value detected by the current detection circuit 134 when the U-phase switch 129U of the connection switching unit 128 is switched to the second switching contact 132U and a voltage is applied to only the U-phase power line 113U and the V-phase power line 113V (S21).

For example, the controller 235 switches the U-phase switch 129U to the second switching contact 132U by transmitting a U-phase switching signal CSU to the connection switching unit 128 through the U-phase control line 135U. The controller 235 applies a voltage to only the U-phase power line 113U and the V-phase power line 113V by transmitting driving signals DS to the inverter 126 to turn on only the first U-phase switching element 126Ua and the second V-phase switching element 126Vb.

The controller 235 determines the presence or absence of an abnormality of the U-phase switch 129U by comparing the first current value and the second current value (S22).

In step S20, if the U-phase switch 129U has no abnormality, a current flows through the U-phase coil 112U and the V-phase coil 112V. In step S21, if the U-phase switch 129U has no abnormality, a current flows through the U-phase coil 112U. This means that the first current value is expected to be about half the second current value. Therefore, when the first current value is different from the second current value, the controller 235 can determine that the U-phase switch 129U has no abnormality. Note that the controller 235 can determine that the first current value is different from the second current value, based on whether the absolute value of the difference of between the values is larger than a predetermined threshold.

The controller 235 obtains, as a third current value, a current value detected by the current detection circuit 134 when the connection switching unit 128 is set in the Y-connection state and a voltage is applied to only the V-phase power line 113V and the W-phase power line 113W (S23).

The controller 235 obtains, as a fourth current value, a current value detected by the current detection circuit 134 when the V-phase switch 129V of the connection switching unit 128 is switched to the second switching contact 132V and a voltage is applied to only the V-phase power line 113V and the W-phase power line 113W (S24).

For example, the controller 235 switches the V-phase switch 129V to the second switching contact 132V by transmitting a V-phase switching signal CSV to the connection switching unit 128 through the V-phase control line 135V. The controller 235 applies a voltage to only the V-phase power line 113V and the W-phase power line 113W by transmitting driving signals DS to the inverter 126 to turn on only the first V-phase switching element 126Va and the second W-phase switching element 126Wb.

The controller 235 determines the presence or absence of an abnormality of the V-phase switch 129V by comparing the third current value and the fourth current value (S25).

In step S23, if the V-phase switch 129V has no abnormality, a current flows through the V-phase coil 112V and the W-phase coil 112W. In step S25, if the V-phase switch 129V has no abnormality, a current flows through the V-phase coil 112V. Therefore, when the third current value is different from the fourth current value, the controller 235 can determine that the V-phase switch 129V has no abnormality. A method for this determination is the same as that in step S22.

The controller 235 obtains, as a fifth current value, a current value detected by the current detection circuit 134 when the connection switching unit 128 is set in the Y-connection state and a voltage is applied to only the W-phase power line 113W and the U-phase power line 113U (S26).

The controller 235 obtains, as a sixth current value, a current value detected by the current detection circuit 134 by switching the W-phase switch 129W of the connection switching unit 128 to the second switching contact 132W and applying a voltage to only the W-phase power line 113W and the U-phase power line 113U (S27).

For example, the controller 235 switches the W-phase switch 129W to the second switching contact 132W by transmitting a W-phase switching signal CSW to the connection switching unit 128 through the W-phase control line 135W. The controller 235 applies a voltage to only the W-phase power line 113W and the U-phase power line 113U by transmitting driving signals DS to the inverter 126 to turn on only the first W-phase switching element 126Wa and the second U-phase switching element 126Ub.

The controller 235 determines the presence or absence of an abnormality of the W-phase switch 129W by comparing the fifth current value and the sixth current value (S28).

In step S26, if the W-phase switch 129W has no abnormality, a current flows through the W-phase coil 112W and the U-phase coil 112U. In step S27, if the W-phase switch 129W has no abnormality, a current flows through the W-phase coil 112W. Therefore, when the fifth current value is different from the sixth current value, the controller 235 can determine that the W-phase switch 129W has no abnormality. A method for this determination is the same as that in step S22.

In the flowchart illustrated in FIG. 13, the first current value and the second current value are detected by applying a voltage to the U-phase power line 113U and the V-phase power line 113V, the third current value and the fourth current value are detected by applying a voltage to the V-phase power line 113V and the W-phase power line 113W, and the fifth current value and the sixth current value are detected by applying a voltage to the W-phase power line 113W and the U-phase power line 113U, but this Embodiment is not limited to such an example. For example, one of the U-phase power line 113U, the V-phase power line 113V, and the W-phase power line 113W is set as a first line, another is set as a second line, and the other is set as a third line. The first current value and the second current value may be detected by applying a voltage to only the first line and the second line by the inverter 126, the third current value and the fourth current value may be detected by applying a voltage to only the second line and the third line by the inverter 126, and the fifth current value and the sixth current value may be detected by applying a voltage to only the third line and the first line by the inverter 126.

In this case, a coil (112U, 112V, or 112W) having one end (112Ua, 112Va, or 112Wa) connected to the first line is set as a first coil, a coil (112U, 112V, or 112W) having one end (112Ua, 112Va, or 112Wa) connected to the second line is set as a second coil, and a coil (112U, 112V, or 112W) having one end (112Ua, 112Va, or 112Wa) connected to the third line is set as a third coil.

A switch (129U, 129V, or 129W) which switches the connection destination of the other end (112Ub, 112Vb, or 112Wb) of the first coil is set as a first switching unit, a switch (129U, 129V, or 129W) which switches the connection destination of the other end (112Ub, 112Vb, or 112Wb) of the second coil is set as a second switching unit, and a switch (129U, 129V, or 129W) which switches the connection destination of the other end (112Ub, 112Vb, or 112Wb) of the third coil is set as a third switching unit.

As described above, according to Embodiment 2, an abnormality of the connection switching unit 128 can be more accurately detected.

The present invention is not limited to above-described Embodiments 1 and 2.

For example, the sequence illustrated in FIG. 6 is executed in one of the Y-connection state and the Δ-connection state in Embodiment 1, but an abnormality of the connection switching unit 128 can be more accurately detected by executing, for example, the sequence illustrated in FIG. 6 in one of the Y-connection state and the Δ-connection state, and executing the sequence illustrated in FIG. 6 in the other state when an abnormality is detected.

When the sequence illustrated in FIG. 6 is executed in the other state, the current value detected in step S10 is obtained, as a fourth current value, the current value detected in step S11 is obtained, as a fifth current value, and the current value detected in step S12 is obtained, as a sixth current value.

In this case, a first threshold and a second threshold (first threshold<second threshold) can also be prepared in advance as thresholds used in step S13 of FIG. 6, so that the controller 135 determines that the connection switching unit 128 is normal when the absolute value of the difference is equal to or smaller than the first threshold, determines that the connection switching unit 128 has an abnormality when the absolute value of the difference is larger than the second threshold, and executes the sequence illustrated in FIG. 6 in the other state when the absolute value of the difference is larger than the first threshold and equal to or smaller than the second threshold.

The sequence illustrated in FIG. 13 may even be executed when an abnormality is detected in the sequence illustrated in FIG. 6.

Embodiment 3

An air conditioner 300 according to Embodiment 3 includes an outdoor unit 310, an indoor unit 150, and a remote controller 160, as illustrated in FIG. 1.

The indoor unit 150 and the remote controller 160 of the air conditioner 300 according to Embodiment 3 are the same as the indoor unit 150 and the remote controller 160 according to Embodiment 1.

The outdoor unit 310 according to Embodiment 3 includes a motor 111, an outdoor air conditioning unit 114, and a driving device 320, as illustrated in FIG. 2.

The motor 111 and the outdoor air conditioning unit 114 of the outdoor unit 310 according to Embodiment 3 are the same as the motor 111 and the outdoor air conditioning unit 114 according to Embodiment 1.

The driving device 320 in Embodiment 3 includes a power supply 121, a reactor 122, a converter 123, an inverter 126, a connection switching unit 128, a shunt resistor 133, a current detection circuit 134, a controller 335, and a communication unit 136.

The driving device 320 in Embodiment 3 is the same as the driving device 120 in Embodiment 1, except for the controller 335.

The controller 335 in Embodiment 3 serves as a control unit which controls each part of the outdoor unit 310. The controller 335 controls, in particular, the outdoor air conditioning unit 114, the inverter 126, and the connection switching unit 128.

The controller 335 in Embodiment 3 is different from the controller 135 in Embodiment 1 in terms of the sequence of detecting an abnormality of the connection switching unit 128 by controlling the inverter 126 and the connection switching unit 128.

Figure 14:
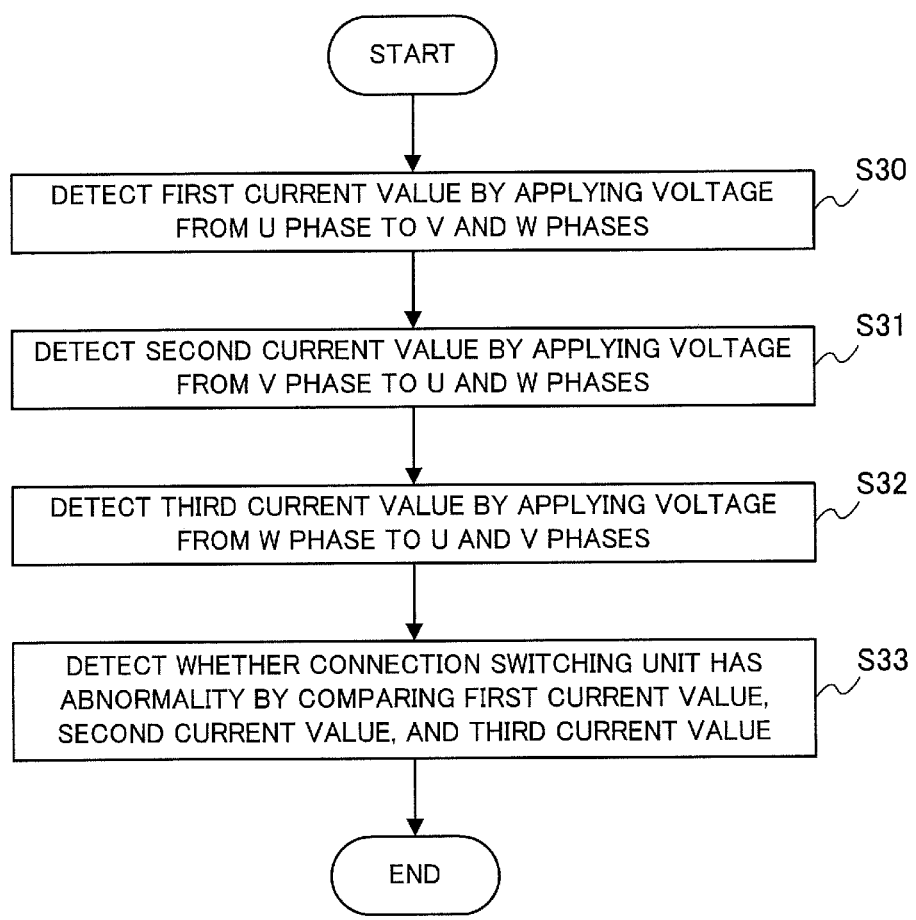
FIG. 14 is a flowchart illustrating an abnormality detection sequence by a controller in Embodiment 3.

FIG. 14 is a flowchart illustrating an abnormality detection sequence by the controller 335 in Embodiment 3.

Assume here that the connection switching unit 128 is set in the Y-connection state or the Δ-connection state.

First, the controller 335 obtains, as a first current value, a current value detected by the current detection circuit 134 when a voltage is applied to supply a current in only the direction from the U-phase power line 113U to the V-phase power line 113V and the W-phase power line 113W (S30). For example, the controller 335 applies a voltage to supply a current in only the direction from the U-phase power line 113U to the V-phase power line 113V and the W-phase power line 113W, by transmitting driving signals DS to the inverter 126 to turn on only the first U-phase switching element 126Ua, the second V-phase switching element 126Vb, and the second W-phase switching element 126Wb. In this case, for example, as illustrated in FIG. 2, when the connection switching unit 128 is in the Y-connection state, as long as the connection switching unit 128 has no abnormality, a current flows through the U-phase coil 112U, the V-phase coil 112V, and the W-phase coil 112W. The value of the bus current in this case is detected as the first current value.

Then, the controller 335 obtains as a second current value, the current value detected by the current detection circuit 134 when a voltage is applied to supply a current in only the direction from the V-phase power line 113V to the U-phase power line 113U and the W-phase power line 113W (S31). For example, the controller 335 applies a voltage to supply a current in only the direction from the V-phase power line 113V to the U-phase power line 113U and the W-phase power line 113W, by transmitting driving signals DS to the inverter 126 to turn on only the first V-phase switching element 126Va, the second U-phase switching element 126Ub, and the second W-phase switching element 126Wb. In this case, for example, as illustrated in FIG. 2, when the connection switching unit 128 is in the Y-connection state, as long as the connection switching unit 128 has no abnormality, a current flows through the U-phase coil 112U, the V-phase coil 112V, and the W-phase coil 112W. The value of the bus current in this case is detected as the second current value.

The controller 335 obtains as a third current value, the current value detected by the current detection circuit 134 when a voltage is applied to supply a current in only the direction from the W-phase power line 113W to the U-phase power line 113U and the V-phase power line 113V (S32). For example, the controller 335 applies a voltage to supply a current in only the direction from the W-phase power line 113W to the U-phase power line 113U and the V-phase power line 113V, by transmitting driving signals DS to the inverter 126 to turn on only the first W-phase switching element 126Wa, the second U-phase switching element 126Ub, and the second V-phase switching element 126Vb. In this case, for example, as illustrated in FIG. 2, when the connection switching unit 128 is in the Y-connection state, if the connection switching unit 128 has no abnormality, a current flows through the U-phase coil 112U, the V-phase coil 112V, and the W-phase coil 112W. The value of the bus current in this case is detected as the third current value.

The controller 335 detects the presence or absence of an abnormality of the connection switching unit 128 by comparing the first current value, the second current value, and the third current value with each other (S33). A method for this comparison is the same as that in Embodiment 1.

For example, as illustrated in FIG. 2, when the connection switching unit 128 is in the Y-connection state, if the connection switching unit 128 has no abnormality, the first current value, the second current value, and the third current value are equal values (normal values).

When, for example, the U-phase switch 129U has opening failure, no current flows through the U-phase coil 112U, the V-phase coil 112V, and the W-phase coil 112W in step S30. Accordingly, the current detection circuit 134 detects no first current value. When the U-phase switch 129U has opening failure, a current flows through the V-phase coil 112V and the W-phase coil 112W while no current flows through the U-phase coil 112U in step S31. The second current value is tree-fourths times the normal value. When the U-phase switch 129U has opening failure, a current flows through the V-phase coil 112V and the W-phase coil 112W while no current flows through the U-phase coil 112U in step S32. The third current value is tree-fourths times the normal value.

When, for example, the U-phase switch 129U has short-circuit failure on the side of the second switching contact 132U, a current flows through the U-phase coil 112U while little current flows through the V-phase coil 112V and the W-phase coil 112W in step S30. The first current value is three-seconds times the normal value. When the U-phase switch 129U has short-circuit failure on the side of the second switching contact 132U, only the U-phase coil 112U is present between the V-phase power line 113V and the U-phase power line 113U and only the V-phase coil 112V and the W-phase coil 112W are present between the V-phase power line 113V and the W-phase power line 113W in step S31. Therefore, the second current value is nine-fourths times the normal value. When the U-phase switch 129U has short-circuit failure on the side of the second switching contact 132U, a current flows through only the V-phase coil 112V and the W-phase coil 112W in step S32. The third current value is three-fourths times the normal value.

As described above, by comparing the first current value, the second current value, and the third current value, for example, the controller 335 can determine that the connection switching unit 128 has no abnormality when the absolute values of the difference between these values are equal to or smaller than a predetermined threshold, and determine that the connection switching unit 128 has an abnormality when the absolute values of the difference between these values are larger than the predetermined threshold or there is any current value that cannot be detected in these values.

In the flowchart illustrated in FIG. 14, the first current value is detected by applying a voltage to supply a current in only the direction from the U-phase power line 113U to the V-phase power line 113V and the W-phase power line 113W, the second current value is detected by applying a voltage to supply a current in only the direction from the V-phase power line 113V to the U-phase power line 113U and the W-phase power line 113W, and the third current value is detected by applying a voltage to supply a current in only the direction from the W-phase power line 113W to the U-phase power line 113U and the V-phase power line 113V, but this Embodiment is not limited to such an example. For example, one of the U-phase power line 113U, the V-phase power line 113V, and the W-phase power line 113W is set as a first line, another one of them is set as a second line, and the remaining one of them is set as a third line. the first current value may be detected by applying a voltage to supply a current in only the first direction from the first line to the second line and the third line by the inverter 126, the second current value may be detected by applying a voltage to supply a current in only the second direction from the second line to the first line and the third line by the inverter 126, and the third current value may be detected by applying a voltage to supply a current in only the third direction from the third line to the first line and the second line by the inverter 126.

As another example, the first current value may be detected by applying a voltage to supply a current in only the first direction from the first line and the second line to the third line by the inverter 126, the second current value may be detected by applying a voltage to supply a current in only the second direction from the second line and the third line to the first line by the inverter 126, and the third current value may be detected by applying a voltage to supply a current in only the third direction from the first line and the third line to the second line by the inverter 126.

In these cases, a coil (112U, 112V, or 112W) having one end (112Ua, 112Va, or 112Wa) connected to the first line is set as a first coil, a coil (112U, 112V, or 112W) having one end (112Ua, 112Va, or 112Wa) connected to the second line is set as a second coil, and a coil (112U, 112V, or 112W) having one end (112Ua, 112Va, or 112Wa) connected to the third line is set as a third coil.

A switch (129U, 129V, or 129W) which switches the connection destination of the other end (112Ub, 112Vb, or 112Wb) of the first coil is set as a first switching unit, a switch (129U, 129V, or 129W) which switches the connection destination of the other end (112Ub, 112Vb, or 112Wb) of the second coil is set as a second switching unit, and a switch (129U, 129V, or 129W) which switches the connection destination of the other end (112Ub, 112Vb, or 112Wb) of the third coil is set as a third switching unit.

Embodiment 4

An air conditioner 400 according to Embodiment 4 includes an outdoor unit 410, an indoor unit 150, and a remote controller 160, as illustrated in FIG. 1.

The indoor unit 150 and the remote controller 160 of the air conditioner 400 according to Embodiment 4 are the same as the indoor unit 150 and the remote controller 160 according to Embodiment 1.

The outdoor unit 410 according to Embodiment 4 includes a motor 111, an outdoor air conditioning unit 114, and a driving device 420, as illustrated in FIG. 2.

The motor 111 and the outdoor air conditioning unit 114 of the outdoor unit 410 according to Embodiment 4 are the same as the motor 111 and the outdoor air conditioning unit 114 according to Embodiment 1.

The driving device 420 in Embodiment 4 includes a power supply 121, a reactor 122, a converter 123, an inverter 126, a connection switching unit 128, a shunt resistor 133, a current detection circuit 134, a controller 435, and a communication unit 136.

The driving device 420 in Embodiment 4 is the same as the driving device 120 in Embodiment 1, except for the controller 435.

The controller 435 in Embodiment 4 serves as a control unit which controls each part of the outdoor unit 410. The controller 435 controls, in particular, the outdoor air conditioning unit 114, the inverter 126, and the connection switching unit 128.

The controller 435 in Embodiment 4 is different from the controller 135 in Embodiment 1 in terms of the sequence of detecting an abnormality of the connection switching unit 128 by controlling the inverter 126 and the connection switching unit 128.

FIG. 15 is a flowchart illustrating an abnormality detection sequence by the controller 435 in Embodiment 4.

First, the controller 435 obtains as, a first current value, a current value detected by the current detection circuit 134 when the connection switching unit 128 is set in the Y-connection state and a voltage is applied to supply a current in only the direction from the U-phase power line 113U to the V-phase power line 113V and the W-phase power line 113W (S40).

Then, the controller 435 obtains, as a second current value, a current value detected by the current detection circuit 134 when the U-phase switch 129U of the connection switching unit 128 is switched to the second switching contact 132U and a voltage is applied to supply a current in only the direction from the U-phase power line 113U to the V-phase power line 113V and the W-phase power line 113W (S41).

The controller 435 determines the presence or absence of an abnormality of the U-phase switch 129U by comparing the first current value and the second current value (S42). For example, when the first current value is different from the second current value, the controller 435 can determine that the U-phase switch 129U has no abnormality. Note that the controller 435 can determine that the first current value is different from the second current value, based on whether the absolute value of the difference between these values is larger than a predetermined threshold.

The controller 435 obtains, as a third current value, a current value detected by the current detection circuit 134 when the connection switching unit 128 is set in the Y-connection state and a voltage is applied to supply a current in only the direction from the V-phase power line 113V to the U-phase power line 113U and the W-phase power line 113W (S43).

The controller 435 obtains, as a fourth current value, a current value detected by the current detection circuit 134 when the V-phase switch 129V of the connection switching unit 128 is switched to the second switching contact 132V and a voltage is applied to supply a current in only the direction from the V-phase power line 113V to the U-phase power line 113U and the W-phase power line 113W (S44).

The controller 435 determines the presence or absence of an abnormality of the V-phase switch 129V by comparing the third current value and the fourth current value (S45). For example, when the third current value is different from the fourth current value, the controller 435 can determine that the V-phase switch 129V has no abnormality. A method for this determination is the same as that in step S42.

The controller 435 obtains, as a fifth current value, a current value detected by the current detection circuit 134 when the connection switching unit 128 is set in the Y-connection state and a voltage is applied to supply a current in only the direction from the W-phase power line 113W to the U-phase power line 113U and the V-phase power line 113V (S46).

The controller 435 obtains, as a sixth current value, a current value detected by the current detection circuit 134 by switching the W-phase switch 129W of the connection switching unit 128 to the second switching contact 132W and applying a voltage to supply a current in only the direction from the W-phase power line 113W to the U-phase power line 113U and the V-phase power line 113V (S47).

The controller 435 determines the presence or absence of an abnormality of the W-phase switch 129W by comparing the fifth current value and the sixth current value (S48). For example, when the fifth current value is different from the sixth current value, the controller 435 can determine that the W-phase switch 129W has no abnormality. A method for this determination is the same as that in step S42.

In the flowchart illustrated in FIG. 15, the first current value and the second current value are detected by applying a voltage to supply a current in only the direction from the U-phase power line 113U to the V-phase power line 113V and the W-phase power line 113W, the third current value and the fourth current value are detected by applying a voltage to supply a current in only the direction from the V-phase power line 113V to the U-phase power line 113U and the W-phase power line 113W, and the fifth current value and the sixth current value are detected by applying a voltage to supply a current in only the direction from the W-phase power line 113W to the U-phase power line 113U and the V-phase power line 113V, but this Embodiment is not limited to such an example. For example, one of the U-phase power line 113U, the V-phase power line 113V, and the W-phase power line 113W is set as a first line, another one of them is set as a second line, and the remaining one of them is set as a third line. The first current value and the second current value may be detected by applying a voltage to supply a current in only the first direction from the first line to the second line and the third line by the inverter 126, the third current value and the fourth current value may be detected by applying a voltage to supply a current in only the second direction from the second line to the first line and the third line by the inverter 126, and the fifth current value and the sixth current value may be detected by applying a voltage to supply a current in only the third direction from the third line to the first line and the second line by the inverter 126.

As another example, the first current value and the second current value may be detected by applying a voltage to supply a current in only the first direction from the first line and the second line to the third line by the inverter 126, the third current value and the fourth current value may be detected by applying a voltage to supply a current in only the second direction from the second line and the third line to the first line by the inverter 126, and the fifth current value and the sixth current value may be detected by applying a voltage to supply a current in only the third direction from the first line and the third line to the second line by the inverter 126.

In these cases, a coil (112U, 112V, or 112W) having one end (112Ua, 112Va, or 112Wa) connected to the first line is set as a first coil, a coil (112U, 112V, or 112W) having one end (112Ua, 112Va, or 112Wa) connected to the second line is set as a second coil, and a coil (112U, 112V, or 112W) having one end (112Ua, 112Va, or 112Wa) connected to the third line is set as a third coil.

A switch (129U, 129V, or 129W) which switches the connection destination of the other end (112Ub, 112Vb, or 112Wb) of the first coil is set as a first switching unit, a switch (129U, 129V, or 129W) which switches the connection destination of the other end (112Ub, 112Vb, or 112Wb) of the second coil is set as a second switching unit, and a switch (129U, 129V, or 129W) which switches the connection destination of the other end (112Ub, 112Vb, or 112Wb) of the third coil is set as a third switching unit.

The present invention is not limited to above-described Embodiments 3 and 4.

For example, the sequence illustrated in FIG. 14 is executed in one of the Y-connection state and the Δ-connection state in Embodiment 3, but an abnormality of the connection switching unit 128 can be more accurately detected by executing, for example, the sequence illustrated in FIG. 14 in one of the Y-connection state and the Δ-connection state, and executing the sequence illustrated in FIG. 14 in the other state when an abnormality is detected.

When the sequence illustrated in FIG. 14 is executed in the other state, the current value detected in step S30 is obtained as a fourth current value, the current value detected in step S31 is obtained as a fifth current value, and the current value detected in step S32 is obtained as a sixth current value.

In this case, a first threshold and a second threshold (first threshold<second threshold) can also be prepared in advance as thresholds used in step S33 of FIG. 14, so that the controller 335 determines that the connection switching unit 128 is normal when the absolute value of the difference is equal to or smaller than the first threshold, determines that the connection switching unit 128 has an abnormality when the absolute value of the difference is larger than the second threshold, and executes the sequence illustrated in FIG. 14 in the other state when the absolute value of the difference is larger than the first threshold and equal to or smaller than the second threshold.

The sequence illustrated in FIG. 15 may even be executed when an abnormality is detected in the sequence illustrated in FIG. 14.

As described above, according to Embodiments 1 to 4, an abnormality of the connection switching unit 128 can be easily detected based on the current value detected by the current detection circuit 134.

Executing the abnormality detection sequence before driving the compressor 114a can prevent failure of the air conditioner 100 or 200 such as a stall of the compressor 114a.

Executing the abnormality detection sequence after driving the indoor fan 151b allows the sound of the indoor fan 151b to drown out a sound occurring in the abnormality detection sequence, so that a user in the room does not feel discomfort.

Executing the abnormality detection sequence after driving the outdoor fan 114c allows the sound of the outdoor fan 114c located outdoors to drown out a sound occurring outdoors in the abnormality detection sequence, so that a user in the room does not feel discomfort.

Executing the abnormality detection sequence in response to reception, by the remote controller 160, of input to start the operation can notify a user of an abnormality immediately after the operation of the remote controller 160, so that it is possible to provide the user with such a notification reliably.

In such a case, executing the abnormality detection sequence before driving the indoor fan 151b makes it possible to provide the user with the notification more reliably, when an abnormality occurs.

According to Embodiment 1, since it is only necessary to compare a plurality of current values detected in the first connection state or the second connection state, an abnormality of the connection switching unit 128 can be easily detected.

Furthermore, for example, when, in the power-OFF of the air conditioner 100, connection switching unit 128 is in one of the first connection state and the second connection state, an abnormality of the connection switching unit 128 can be detected without operating the connection switching unit 128 by executing the abnormality detection sequence in this state. Therefore, a waste of power due to switching operation can be reduced and shortening the life due to an increase in the number of operation of the connection switching unit 128 can also be reduced.

When an abnormality is detected in the abnormality detection sequence executed in one of the first connection state and the second connection state, an abnormality of the connection switching unit 128 can be more reliably detected by executing the abnormality detection sequence in the other state.

Since the U-phase switch 129U, the V-phase switch 129V, and the W-phase switch 129W can be operated individually, the power supply capacity required for the switching operation can be reduced compared to the case where all the switches are operated simultaneously, and a low-capacity power supply circuit can be used. This can curb the raise in cost due to increase in the capacity of the power supply circuit. A place where a failure has occurred can be more accurately detected by individually operating these switches.

The presence or absence of an abnormality can be more reliably detected by abnormality detection based on the current values detected before and after switching of the U-phase switch 129U, the V-phase switch 129V, or the W-phase switch 129W.

The use of semiconductor switches, especially switching elements made by using a WBG semiconductor, as the U-phase switch 129U, the V-phase switch 129V, and the W-phase switch 129W allows low ON resistances, low losses, and reduction in element heat generation.

The invention claimed is:

1. An air conditioner using a refrigeration cycle, the air conditioner comprising:
   a compressor to compress a refrigerant used in the refrigeration cycle;
   a fan to blow air to a heat exchanger;
   a converter to generate a DC voltage;
   an inverter to generate three-phase AC voltages from the DC voltage;
   a motor to produce a driving force for driving the compressor with a plurality of coils, the three-phase AC voltages being applied to the coils;
   a connection switching unit to switch connection states of the coils between a first connection state and a second connection state;
   a current detection circuit to detect a current value of a current on an input side of the inverter, and
   a controller to detect an abnormality of the connection switching unit,
   wherein the abnormality is opening failure or short-circuit failure,
   wherein the controller detects the abnormality of the connection switching unit, based on the current value,
   wherein the connection switching unit sets the connection states of the coils to one of the first connection state and the second connection state, the inverter is connected to the motor with a first line, a second line, and a third line, the inverter individually applies a voltage in order to a combination of the first line and the second line, a combination of the second line and the third line, and a combination of the third line and the first line, the current detection circuit detects, as a first current value, a current value of the current on the input side of the inverter when the inverter applies the voltage to only the first line and the second line, detects, as a second current value, a current value of the current on the input side of the inverter when the inverter applies the voltage to only the second line and the third line, and detects, as a third current value, a current value of the current on the input side of the inverter when the inverter applies the voltage to only the third line and the first line, and the controller detects the abnormality of the connection switching unit by comparing the first current value, the second current value, and the third current value to each other, wherein, after the air conditioner receives an input to start an operation of the air conditioner, the fan is driven, and after the fan is driven and before the compressor is driven, the controller detects the abnormality of the connection switching unit.

2. The air conditioner according to claim 1, wherein
the fan is used in an outdoor unit; and
the fan is driven after receiving the input to start, and after the fan is driven and before the compressor is driven, the controller detects the abnormality of the connection switching unit.

3. The air conditioner according to claim 1, further comprising an input reception unit to receive input to start an operation of the air conditioner,
wherein the controller detects the abnormality of the connection switching unit in response to reception of the input by the input reception unit.

4. The air conditioner according to claim 3, wherein
the fan is used in an indoor unit; and
the controller detects the abnormality of the connection switching unit before the fan is driven after the input reception unit receives the input.

5. The air conditioner according to claim 1, wherein the controller determines that the connection switching unit has the abnormality when at least one of the first current value, the second current value, and the third current value is different from another one of the first current value, the second current value, and the third current value, or when at least one of the first current value, the second current value, and the third current value is not detected.

6. The air conditioner according to claim 5, wherein the controller determines that at least one of the first current value, the second current value, and the third current value is different from another one of the first current value, the second current value, and the third current value if any absolute value of difference of each pair of the first current value, the second current value, and the third current value is larger than a predetermined threshold.

7. The air conditioner according to claim 1, wherein
the connection switching unit sets the connection states of the coils to another of the first connection state and the second connection state after the current detection circuit detects the first current value, the second current value, and the third current value, the inverter individually applies a voltage in order to a combination of the first line and the second line, a combination of the second line and the third line, and a combination of the third line and the first line, the current detection circuit detects, as a fourth current value, a current value of the current on the input side of the inverter when the inverter applies the voltage to only the first line and the second line, detects, as a fifth current value, a current value of the current on the input side of the inverter when the inverter applies the voltage to only the second line and the third line, and detects, as a sixth current value, a current value of the current on the input side of the inverter when the inverter applies the voltage to only the third line and the first line, and the controller detects the abnormality of the connection switching unit by comparing the fourth current value, the fifth current value, and the sixth current value.

8. The air conditioner according to claim 1, wherein
the coils are a first coil having one end connected to the first line, a second coil having one end connected to the second line, and a third coil having one end connected to the third line,
the connection switching unit has
a first switch to switch a connection destination of another end of the first coil;
a second switch to switch a connection destination of another end of the second coil; and
a third switch to switch a connection destination of another end of the third coil, and
the first switch, the second switch, and the third switch individually switch the connection destinations in accordance with an instruction from the controller.

9. The air conditioner according to claim 8, wherein the first switch, the second switch, and the third switch are semiconductor switches.

10. The air conditioner according to claim 9, wherein the semiconductor switches are switching elements made by using a WBG semiconductor.

11. An air conditioner using a refrigeration cycle, the air conditioner comprising:
a compressor to compress a refrigerant used in the refrigeration cycle;
a fan to blow air to a heat exchanger;
a converter to generate a DC voltage;
an inverter to generate three-phase AC voltages from the DC voltage;
a motor to produce a driving force for driving the compressor with a plurality of coils, the three-phase AC voltages being applied to the coils;
a connection switching unit to switch connection states of the coils between a first connection state and a second connection state;
a current detection circuit to detect a current value of a current on an input side of the inverter, and
a controller to detect an abnormality of the connection switching unit,
wherein the abnormality is opening failure or short-circuit failure,
wherein the controller detects the abnormality of the connection switching unit, based on the current value, wherein the connection switching unit sets the connection states of the coils to one of the first connection state and the second connection state, the inverter is connected to the motor with a first line, a second line, and a third line, the inverter applies a voltage so that a current flows in order in only a first direction from the first line to the second line and the third line, in only a second direction from the second line to the first line and the third line, and in only a third direction from the third line to the first line and the second line, individually, the current detection circuit detects, as a first current value, a current value of the current on the input side of the inverter when the inverter applies the voltage so that the current flows in only the first direction, detects, as a second current value, a current value of the current on the input side of the inverter when the inverter applies the voltage so that the current flows in only the second direction, and detects, as a third current value, a current value of the current on the input side of the inverter when the inverter applies the voltage so that the current flows in only the third direction, and the controller detects the abnormality of the connection switching unit by comparing the first current value, the second current value, and the third current value to each other, wherein, after the air conditioner receives an input to start an operation of the air conditioner, the fan is driven, and after the fan is driven and before the compressor is driven, the controller detects the abnormality of the connection switching unit.

12. The air conditioner according to claim 11, wherein the connection switching unit sets the connection states of the coils to another of the first connection state and the second connection state after the current detection circuit detects the first current value, the second current value, and the third current value, the inverter applies a voltage so that a current flows in order in only a first direction from the first line to the second line and the third line, in only a second direction from the second line to the first line and the third line, and in only a third direction from the third line to the first line and the second line, the current detection circuit detects, as a fourth current value, a current value of the current on the input side of the inverter when the inverter applies the voltage so that the current flows in only the first direction, detects, as a fifth current value, a current value of the current on the input side of the inverter when the inverter applies the voltage so that the current flows in only the second direction, and detects, as a sixth current value, a current value of the current on the input side of the inverter when the inverter applies the voltage so that the current flows in only the third direction, and the controller detects the abnormality of the connection switching unit by comparing the fourth current value, the fifth current value, and the sixth current value.

13. The air conditioner according to claim 11, wherein the controller determines that the connection switching unit has the abnormality when at least one of the first current value, the second current value, and the third current value is different from another one of the first current value, the second current value, and the third current value, or when at least one of the first current value, the second current value, and the third current value is not detected.

14. The air conditioner according to claim 11, wherein the coils are a first coil having one end connected to the first line, a second coil having one end connected to the second line, and a third coil having one end connected to the third line, the connection switching unit has a first switch to switch a connection destination of another end of the first coil;

a second switch to switch a connection destination of another end of the second coil; and a third switch to switch a connection destination of another end of the third coil, and the first switch, the second switch, and the third switch individually switch the connection destinations in accordance with an instruction from the controller.

15. The air conditioner according to claim 14, wherein the first switch, the second switch, and the third switch are semiconductor switches.

16. An air conditioner using a refrigeration cycle, the air conditioner comprising:

a compressor to compress a refrigerant used in the refrigeration cycle;

a fan to blow air to a heat exchanger;

a converter to generate a DC voltage;

an inverter to generate three-phase AC voltages from the DC voltage;

a motor to produce a driving force for driving the compressor with a plurality of coils, the three-phase AC voltages being applied to the coils;

a connection switching unit to switch connection states of the coils between a first connection state and a second connection state;

a current detection circuit to detect a current value of a current on an input side of the inverter, and a controller to detect an abnormality of the connection switching unit, wherein the abnormality is opening failure or short-circuit failure, wherein the controller detects the abnormality of the connection switching unit, based on the current value, wherein the connection switching unit sets the connection states of the coils to one of the first connection state and the second connection state, the inverter is connected to the motor with a first line, a second line, and a third line, the inverter applies a voltage so that a current flows in order in only a first direction from the first line and the second line to the third line, in only a second direction from the second line and the third line to the first line, and in only a third direction from the first line and the third line to the second line, individually, the current detection circuit detects, as a first current value, a current value of the current on the input side of the inverter when the inverter applies the voltage so that the current flows in only the first direction, detects, as a second current value, a current value of the current on the input side of the inverter when the inverter applies the voltage so that the current flows in only the second direction, and detects as a third current value, a current value of the current on the input side of the inverter when the inverter applies the voltage so that the current flows in only the third direction, and the controller detects the abnormality of the connection switching unit by comparing the first current value, the second current value, and the third current value to each other, wherein, after the air conditioner receives an input to start an operation of the air conditioner, the fan is driven, and after the fan is driven and before the compressor is driven, the controller detects the abnormality of the connection switching unit.

17. The air conditioner according to claim 16, wherein the connection switching unit sets the connection state of the coils to another of the first connection state and the second connection state after the current detection circuit detects the first current value, the second current value, and the third current value, the inverter applies a voltage so that a current flows in order in only a first direction from the first line and the second line to the third line, in only a second direction from the second line and the third line to the first line, and in only a third direction from the first line and the third line to the second line, the current detection circuit detects, as a fourth current value, a current value of the current on the input side of the inverter when the inverter applies the voltage so that the current flows in only the first direction, detects, as a fifth current value, a current value of the current on the input side of the inverter when the inverter applies the voltage so that the current flows in only the second direction, and detects, as a sixth current value, a current value of the current on the input side of the inverter when the inverter applies the voltage so that the current flows in only the third direction, and the controller detects the abnormality of the connection switching unit by comparing the fourth current value, the fifth current value, and the sixth current value.

18. The air conditioner according to claim 16, wherein the controller determines that the connection switching unit has the abnormality when at least one of the first current value, the second current value, and the third current value is different from another one of the first current value, the second current value, and the third current value, or when at least one of the first current value, the second current value, and the third current value is not detected.

19. The air conditioner according to claim 16, wherein the coils are a first coil having one end connected to the first line, a second coil having one end connected to the second line, and a third coil having one end connected to the third line, the connection switching unit has a first switch to switch a connection destination of another end of the first coil;

a second switch to switch a connection destination of another end of the second coil; and a third switch to switch a connection destination of another end of the third coil, and the first switch, the second switch, and the third switch individually switch the connection destinations in accordance with an instruction from the controller.

20. The air conditioner according to claim 19, wherein the first switch, the second switch, and the third switch are semiconductor switches.

* * * * *